US012437776B2

(12) United States Patent
Har-Lev et al.

(10) Patent No.: US 12,437,776 B2
(45) Date of Patent: Oct. 7, 2025

(54) AUTOMATED CLASSIFICATION OF RELATIVE DOMINANCE BASED ON RECIPROCAL PROSODIC BEHAVIOUR IN AN AUDIO CONVERSATION

(71) Applicant: SubStrata Ltd., Tel Aviv (IL)

(72) Inventors: Baruchi Har-Lev, Herzliya (IL); Ori Manor Zuckerman, Tel Aviv (IL); Eran Yessodi, Kfar-Saba (IL); Alessandro Vinciarelli, Glasgow (GB)

(73) Assignee: SubStrata Ltd., Tel Aviv (IL)

( * ) Notice: Subject to any disclaimer, the term of this patent is extended or adjusted under 35 U.S.C. 154(b) by 481 days.

(21) Appl. No.: 17/947,507

(22) Filed: Sep. 19, 2022

(65) Prior Publication Data

US 2024/0105208 A1 Mar. 28, 2024

(51) Int. Cl.
*G10L 25/63* (2013.01)
*G10L 17/02* (2013.01)
*G10L 17/04* (2013.01)
*G10L 25/03* (2013.01)

(52) U.S. Cl.
CPC .............. *G10L 25/63* (2013.01); *G10L 17/02* (2013.01); *G10L 17/04* (2013.01); *G10L 25/03* (2013.01)

(58) Field of Classification Search
CPC ......... G10L 25/63; G10L 17/02; G10L 17/04; G10L 25/03; G10L 25/30; G10L 25/48; H04M 3/42221; H04M 3/5175
USPC .......................................................... 704/243
See application file for complete search history.

(56) References Cited

U.S. PATENT DOCUMENTS 4,707,857 A * 11/1987 Marley .................. G10L 15/00 704/243
4,783,807 A * 11/1988 Marley .................. G10L 25/90 704/235
6,993,245 B1 * 1/2006 Harville .................. H04N 5/76 386/E5.001
9,934,793 B2 * 4/2018 Bae ......................... G10L 25/48
10,540,979 B2 * 1/2020 Visser ..................... G10L 15/22
11,538,461 B1 * 12/2022 Gupta ..................... G10L 15/16
11,854,538 B1 * 12/2023 Rozgic .................... G10L 25/63
(Continued)

FOREIGN PATENT DOCUMENTS

EP 3976074 A1 4/2022
EP 4006903 A1 6/2022
(Continued)

*Primary Examiner* — Thuykhanh Le
(74) *Attorney, Agent, or Firm* — Whitestone Law, PLLC

(57) ABSTRACT

A system comprising a processor and memory circuitry configured to, for at least one session comprising at least an audio content: for a first participant, extract features informative of an audio content associated with the first participant in a first initial period of time to generate first baseline data, for at least one first period of time starting after an end of the first initial period of time, extract features informative of an audio content associated with the first participant in the first period of time to generate first updated baseline data, perform similar operations for a second participant to generate second baseline data and second updated baseline data, feed the first and second baseline data, the first and second updated baseline data to a machine learning module to determine data informative of the dominance of the first participant and/or the second participant in the session.

19 Claims, 16 Drawing Sheets

(56) References Cited

U.S. PATENT DOCUMENTS 12,159,647 B1 * 12/2024 Churgin .................. G10L 17/14
12,230,291 B2 * 2/2025 Smith ...................... H04R 3/00
2007/0067159 A1 * 3/2007 Basu ................... H04M 3/2281 704/200
2008/0126904 A1 * 5/2008 Sung ..................... H04L 1/0045 714/E11.03
2009/0259697 A1 * 10/2009 Satou ...................... G06F 16/27
2011/0205330 A1 * 8/2011 Liu ........................ H04N 7/142 348/E7.083
2012/0253807 A1 * 10/2012 Kamano ................. G10L 17/26 704/E15.001
2014/0067419 A1 * 3/2014 Ohta ...................... G16H 40/67 705/3
2014/0067420 A1 * 3/2014 Ohta ...................... G16H 80/00 705/3
2014/0278354 A1 * 9/2014 Ganong, III ............ G10L 15/26 704/235
2014/0278401 A1 * 9/2014 Ganong, III .......... G06F 16/685 704/235
2014/0320588 A1 * 10/2014 Midtun ............... H04L 12/1895 370/260
2015/0228293 A1 * 8/2015 Gunawan ............ G10L 21/0272 704/225
2016/0086599 A1 * 3/2016 Kurata .................. G10L 15/187 704/243
2016/0224869 A1 * 8/2016 Clark-Polner ......... G06Q 50/00
2018/0027123 A1 * 1/2018 Cartwright ........ H04M 3/42221 379/202.01
2018/0054688 A1 * 2/2018 Cartwright ................ H04S 7/30
2018/0279063 A1 * 9/2018 Sun ....................... H04M 3/565
2018/0295240 A1 * 10/2018 Dickins ................. H04M 3/568
2018/0336902 A1 * 11/2018 Cartwright .............. G06F 16/61
2019/0179892 A1 * 6/2019 Chen ..................... G06F 40/279
2020/0034387 A1 * 1/2020 Kagawa ............. G06F 16/5866
2020/0043514 A1 * 2/2020 Liu ......................... G10L 15/22
2020/0388283 A1 * 12/2020 Tang ....................... G10L 15/26
2021/0076002 A1 * 3/2021 Peters .................... H04N 7/152
2021/0110154 A1 * 4/2021 Beller ................... G06F 40/279
2021/0208842 A1 * 7/2021 Cassidy ................. G05B 15/02
2021/0272586 A1 * 9/2021 Smith ..................... G10L 25/84
2021/0335367 A1 * 10/2021 Graff ....................... G06F 40/20
2021/0399911 A1 * 12/2021 Jorasch ............... H04L 12/1818
2022/0084509 A1 * 3/2022 Sivaraman ............. G06N 3/045
2022/0335949 A1 * 10/2022 Liu ....................... H04M 3/568
2023/0223032 A1 * 7/2023 Hwang ................... G10L 17/00 704/200
2023/0260533 A1 * 8/2023 Farrell .................... G10L 25/27 704/231
2023/0368760 A1 * 11/2023 Sobajima ................. G10G 1/00
2024/0005085 A1 * 1/2024 Kukde .................... G10L 25/78
2024/0007295 A1 * 1/2024 Miyamoto ............ H04L 9/0891
2024/0071412 A1 * 2/2024 Sand ....................... G10L 25/63
2024/0079023 A1 * 3/2024 Hamlin ................. H04M 3/568
2024/0160849 A1 * 5/2024 Fanelli .................... G10L 25/84
2024/0185888 A1 * 6/2024 Sharafyan ............... G10L 15/08
2024/0354493 A1 * 10/2024 Nakajima ............... G10L 17/18
2024/0404312 A1 * 12/2024 Miura ...................... G10H 1/00

FOREIGN PATENT DOCUMENTS

EP 4020467 A1 6/2022
EP 3791390 B1 1/2023

* cited by examiner

AUTOMATED CLASSIFICATION OF RELATIVE DOMINANCE BASED ON RECIPROCAL PROSODIC BEHAVIOUR IN AN AUDIO CONVERSATION

TECHNICAL FIELD

The presently disclosed subject matter relates, in general, to the field of computerized analysis of a behavior of participants in a session including audio content.

BACKGROUND

In various fields (academic field, business field, scientific field, etc.), it is beneficial to determine data informative of the behavior of people, for example during a recorded audio and/or video session.

In this context, there is a growing need to propose new methods and systems capable of automatically determining data informative of the behavior of people in a recorded audio and/or video session.

GENERAL DESCRIPTION

In accordance with certain aspects of the presently disclosed subject matter, there is provided a system comprising a processor and memory circuitry (PMC) configured to, for at least one session comprising at least an audio content, the session involving at least a first participant and a second participant: for the first participant, extract features informative of an audio content associated with the first participant in a first initial period of time to generate first baseline data, for at least one first period of time starting after an end of the first initial period of time, extract features informative of an audio content associated with the first participant in the first period of time to generate first updated baseline data, for the second participant, extract features informative of an audio content associated with the second participant in a second initial period of time to generate second baseline data, for at least one second period of time starting after an end of the second initial period of time, extract features informative of an audio content associated with the second participant in the second period of time to generate second updated baseline data, feed the first baseline data, the second baseline data, the first updated baseline data, and the second updated baseline data, to a machine learning module, and determine, using the machine learning module, data $D_{dominance}$ informative of the dominance of at least one of the first participant or the second participant in at least part of the session.

In addition to the above features, the system according to this aspect of the presently disclosed subject matter can optionally comprise one or more of features (i) to (xxv) below, in any technically possible combination or permutation:

i. the first period of time and the second period of time match a synchronization criterion, wherein the system is configured to determine data $D_{dominance}$ informative of the dominance of at least one of the first participant or the second participant in at least one of part of the first period of time or part of the second period of time;

ii. the first initial period of time has a duration which is longer than a duration of the at least one first period of time, and the second initial period of time has a duration which is longer than a duration of the at least one second period of time;

iii. the system is configured to repeatedly generate given first updated baseline data for each of plurality of given first periods of time starting after an end of the first initial period of time, thereby obtaining a plurality of first updated baseline data, repeatedly generate given second updated baseline data for each of plurality of given second periods of time starting after an end of the second initial period of time, thereby obtaining a plurality of second updated baseline data, feed the first baseline data, the second baseline data, the plurality of first updated baseline data and the plurality of second updated baseline data to the machine learning module, and determine, using the machine learning module, data $D_{dominance}$ informative of the dominance of at least one of the first participant or the second participant in at least part of the session;

iv. the system is configured to determine, within an assessment period starting at a time at which the first participant started to produce vocal communication in the session, a period of time for which an amount of vocal communication time of the first participant meets a required duration, and select this period of time as the first initial period of time;

v. the system is configured to determine, within an assessment period starting at a time at which the second participant started to produce vocal communication in the session, a period of time for which an amount of vocal communication of the second participant meets a required duration, and select this period of time as the second initial period of time;

vi. at least one of the first initial period of time or the second initial period of time is discontinuous;

vii. upon determination that there is no period of time for which an amount of vocal communication of the first participant meets the required duration within the assessment period, the system is configured to select all of one or more fractions of the assessment period in which the first participant produced vocal communication as the first initial period of time;

viii. upon determination that there is no period of time for which an amount of speech time of the second participant meets the required duration within the assessment period, the system is configured to select all of one or more fractions of the assessment period in which the second participant produced vocal communication as the second initial period of time;

ix. the machine learning module is at least partially trained to determine $D_{dominance}$ using supervised learning, the supervised learning using a training set comprising: an audio content of a training session including a plurality of participants, one or more labels defining the dominance of one or more of the participants in the training session;

x. the system is configured to determine a vector $VF_1$ comprising features informative of an audio content associated with the first participant in a first limited period of time being at least partially within the first period of time, wherein a duration of the first limited period of time is shorter than a duration of the first period of time, determine a vector $VF_2$ comprising features informative of an audio content associated with the second participant in a second limited period of time being at least partially within the second period of time, wherein a duration of the second limited period of time is shorter than a duration of the second period of time, feed the first baseline data, the second baseline data, the first updated baseline data, the second updated baseline data, $VF_1$ and $VF_2$ to the machine learning module, and determine, using the machine learning module, data $D_{dominance}$ informative of the dominance of at least one of the first participant or the second participant in at least part of the session;

xi. the system is configured to determine first features of the audio content associated with the first participant in each of a plurality of fractions of the first limited period of time and second features of the audio content associated with the first participant, in the whole first limited period of time, and use the first and second features to generate $VF_1$;

xii. the system is configured to determine first features of the audio content associated with the second participant in each of a plurality of fractions of the second limited period of time and second features of the audio content associated with the second participant, in the whole second limited period of time, and use the first and second features to generate $VF_2$;

xiii. the system is configured to determine features $STF_{1/init}$ of the audio content associated with the first participant in each of a plurality of first time fractions of the audio content, features $LTF_{1/init}$ of the audio content associated with the first participant in a first limited period of time corresponding to the plurality of first time fractions, wherein the first limited period of time is within the first initial period of time and has a duration shorter than the first initial period of time, and use $STF_{1/init}$ and $LTF_{1/init}$ to generate the first baseline data;

xiv. the system is configured to determine features $STF_{2/init}$ of the audio content associated with the second participant in each of a plurality of second time fractions of the audio content, features $LTF_{2/init}$ of the audio content associated with the second participant in a second limited period of time corresponding to the plurality of second time fractions, wherein the second limited period of time is within the second initial period of time and has a duration shorter than the first initial period of time, and use $STF_{2/init}$ and $LTF_{2/init}$ to generate the second baseline data;

xv. the system is configured to, for a given first limited period of time, perform an aggregation operation of features $LTF_{1/init}$ obtained for this given first limited period of time with features $STF_{1/init}$ obtained for a plurality of given first time fractions of this given first limited period of time, to obtain $FT_{1/init/aggregated}$, and use $FT_{1/init/aggregated}$ to generate the first baseline data;

xvi. the system is configured to, fora given second limited period of time, perform an aggregation operation of features $LTF_{2/init}$ obtained for this given second limited period of time with features $STF_{2/init}$ obtained for a plurality of given second time fractions of this given second limited period of time, to obtain $FT_{2/init/aggregated}$, and use $FT_{2/init/aggregated}$ to generate the second baseline data;

xvii. the system is configured to determine $FT_{1/init/aggregated}$ over a plurality of first limited periods of time within the first initial period of time to generate the first baseline data;

xviii. the system is configured to determine $FT_{2/init/aggregated}$ over a plurality of second limited periods of time within the second initial period of time to generate the second baseline data;

xix. the system is configured to determine features $STF_1$ of the audio content associated with the first participant in each of a plurality of first time fractions of the audio content, features $LTF_1$ of the audio content associated with the first participant in a first limited period of time corresponding to the plurality of first time fractions, wherein the first limited period of time is within the first period of time and has a duration shorter than the first period of time, and use $STF_1$ and $LTF_1$ to generate the first updated baseline data;

xx. the system is configured to determine features $STF_1$ of the audio content associated with the second participant in each of a plurality of second time fractions of the audio content, features $LTF_1$ of the audio content associated with the second participant in a second limited period of time corresponding to the plurality of second time fractions, wherein the second limited period of time is within the second period of time and has a duration shorter than the second period of time, and use $STF_2$ and $LTF_2$ to generate the second updated baseline data;

xxi. the system is configured to, for a given first limited period of time, perform an aggregation operation of features $LTF_1$ obtained for this given first limited period of time with features $STF_1$ obtained for a plurality of given first time fractions of this given first limited period of time, to obtain $FT_{1/aggregated}$, and use $FT_{1/aggregated}$ to generate the first updated baseline data;

xxii. the system is configured to, for a given second limited period of time, performing an aggregation operation of features $LTF_2$ obtained for this given second limited period of time with features $STF_2$ obtained for a plurality of given second time fractions of this given second limited period of time, to obtain $FT_{2/aggregated}$, and use $FT_{2/aggregated}$ to generate the second updated baseline data;

xxiii. the system is configured to determine $FT_{1/aggregated}$ over a plurality of first limited periods of time within the first period of time to generate the first updated baseline data;

xxiv. the system is configured to determine $FT_{2/aggregated}$ over a plurality of second limited periods of time within the second period of time to generate the second updated baseline data; and xxv. the features comprise at least one of pitch, intensity of speech, speech rate, total speaking energy, total speaking length, total silence length.

In accordance with certain other of the presently disclosed subject matter, there is provided a method comprising executing, by a processor and memory circuitry, operations described above with respect to the system.

In accordance with certain other of the presently disclosed subject matter, there is provided a system comprising a processor and memory circuitry (PMC) configured to: obtain, for at least one session comprising at least an audio content, the session involving a first participant and a second participant, a label informative of the dominance of at least of the first participant or the second participant of the session, for the first participant, extract features informative of an audio content associated with the first participant in a first initial period of time to generate first baseline data, for at least one first period of time starting after an end of the first initial period of time, extract features informative of an audio content associated with the first participant in the first period of time to generate first updated baseline data, for the second participant, extract features informative of an audio content associated with the second participant in a second initial period of time to generate second baseline data, for at least one second period of time starting after an end of the second initial period of time, extract features informative of an audio content associated with the second participant in the second period of time to generate second updated baseline data, use the label, the first baseline data, the second baseline data, the first updated baseline data and the second updated baseline data to train a machine learning module, wherein the machine learning module is usable, after its training, to determine data $D_{dominance}$ informative of the dominance of one or more participants of a plurality of participants in a given session, based on an audio content of the given session.

In addition to the above features, the system according to this aspect of the presently disclosed subject matter can optionally comprise one or more of features (xxvi) to (xxx) below, in any technically possible combination or permutation:

xxvi. the system is configured to determine features $STF_{1/init}$ of the audio content associated with the first participant in each of a plurality of first time fractions of the audio content and features $LTF_{1/init}$ of the audio content associated with the first participant in a first limited period of time corresponding to the plurality of first time fractions, wherein the first limited period of time is within the first initial period of time and has a duration shorter than the first initial period of time, and use $STF_{1/init}$ and $LTF_{1/init}$ to generate the first baseline data;

xxvii. the system is configured to determine features $STF_{2/init}$ of the audio content associated with the second participant in each of a plurality of second time fractions of the audio content, features $LTF_{2/init}$ of the audio content associated with the second participant in a second limited period of time corresponding to the plurality of second time fractions, wherein the second limited period of time is within the second initial period of time and has a duration shorter than the first initial period of time, and use $STF_{2/init}$ and $LTF_{2/init}$ to generate the second baseline data;

xxviii. the system is configured to determine features $STF_1$ of the audio content associated with the first participant in each of a plurality of first time fractions of the audio content, features $LTF_1$ of the audio content associated with the first participant in a first limited period of time corresponding to the plurality of first time fractions, wherein the first limited period of time is within the first period of time and has a duration shorter than the first period of time, and use $STF_1$ and $LTF_1$ to generate the first updated baseline data;

xxix. the system is configured to determine features $STF_1$ of the audio content associated with the second participant in each of a plurality of second time fractions of the audio content, features $LTF_1$ of the audio content associated with the second participant in a second limited period of time corresponding to the plurality of second time fractions, wherein the second limited period of time is within the second period of time and has a duration shorter than the second period of time, and use $STF_2$ and $LTF_2$ to generate the second updated baseline data;

xxx. the system is configured to determine a vector $VF_1$ comprising features informative of an audio content associated with the first participant in a first limited period of time being at least partially within the first period of time, wherein a duration of the first limited period of time is shorter than a duration of the first period of time, and determine a vector $V_{F2}$ comprising features informative of an audio content associated with the second participant in a second limited period of time being at least partially within the second period of time, wherein a duration of the second limited period of time is shorter than a duration of the second period of time, use the first baseline data, the second baseline data, the first updated baseline data, the second updated baseline data, $VF_1$ and $VF_2$ to train the machine learning module.

In accordance with certain other of the presently disclosed subject matter, there is provided a method comprising executing, by a processor and memory circuitry, operations described above with respect to the system.

In accordance with certain other of the presently disclosed subject matter, there is provided a non-transitory computer readable medium comprising instructions that, when executed by a processor and memory circuitry (PMC), cause the PMC to perform operations comprising, for at least one session comprising at least an audio content, the session involving at least a first participant and a second participant: for the first participant, extracting features informative of an audio content associated with the first participant in a first initial period of time to generate first baseline data, for at least one first period of time starting after an end of the first initial period of time, extracting features informative of an audio content associated with the first participant in the first period of time to generate first updated baseline data, for the second participant, extracting features informative of an audio content associated with the second participant in a second initial period of time to generate second baseline data, for at least one second period of time starting after an end of the second initial period of time, extracting features informative of an audio content associated with the second participant in the second period of time to generate second updated baseline data, feeding the first baseline data, the second baseline data, the first updated baseline data and the second updated baseline data to a machine learning module, and determining, using the machine learning module, data $D_{dominance}$ informative of the dominance of at least one of the first participant or the second participant in at least part of the session.

According to some embodiments, the non-transitory computer readable medium comprises instructions that, when executed by a PMC, cause the PMC to perform operations (i) to (xxv) as described above.

In accordance with certain other of the presently disclosed subject matter, there is provided a non-transitory computer readable medium comprising instructions that, when executed by a processor and memory circuitry (PMC), cause the PMC to perform operations comprising: obtaining, for at least one session comprising at least an audio content, the session involving a first participant and a second participant, a label informative of the dominance of at least of the first participant or the second participant of the session, for the first participant, extracting features informative of an audio content associated with the first participant in a first initial period of time to generate first baseline data, for at least one first period of time starting after an end of the first initial period of time, extracting features informative of an audio content associated with the first participant in the first period of time to generate first updated baseline data, for the second participant, extracting features informative of an audio content associated with the second participant in a second initial period of time to generate second baseline data, for at least one second period of time starting after an end of the second initial period of time, extracting features informative of an audio content associated with the second participant in the second period of time to generate second updated baseline data, using the label, the first baseline data, the second baseline data, the first updated baseline data and the second updated baseline data to train a machine learning module, wherein the machine learning module is usable, after its training, to determine data $D_{dominance}$ informative of the dominance of one or more participants of a plurality of participants in a given session, based on an audio content of the given session.

According to some embodiments, the non-transitory computer readable medium comprises instructions that, when executed by a PMC, cause the PMC to perform operations (xxvi) to (xxx) as described above.

Among advantages of certain embodiments of the presently disclosed subject matter is to provide a computerized solution which determines, in an accurate and efficient way, data informative of the dominance of one or more participants in a recorded session.

According to some embodiments, the proposed solution is able to automatically determine data informative of the dominance of one or more participants in a session, in real time or quasi real time.

According to some embodiments, the proposed solution is able to learn the behavior of participants over periods of time of various scales, thereby providing both a short term analysis and long term analysis of the behavior of participants.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as “obtaining”, “using”, “determining”, “generating”, “training”, “feeding”, “splitting”, or the like, refer to the action(s) and/or process (es) of a processor and memory circuitry that manipulates and/or transforms data into other data, said data represented as physical, such as electronic, quantities and/or said data representing the physical objects. The term “processor and memory circuitry” covers any computing unit or electronic unit with data processing circuitry that may perform tasks based on instructions stored in a memory, such as a computer, a server, a chip, a hardware processor, etc. It encompasses a single processor or multiple processors, which may be located in the same geographical zone, or may, at least partially, be located in different zones and may be able to communicate together.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
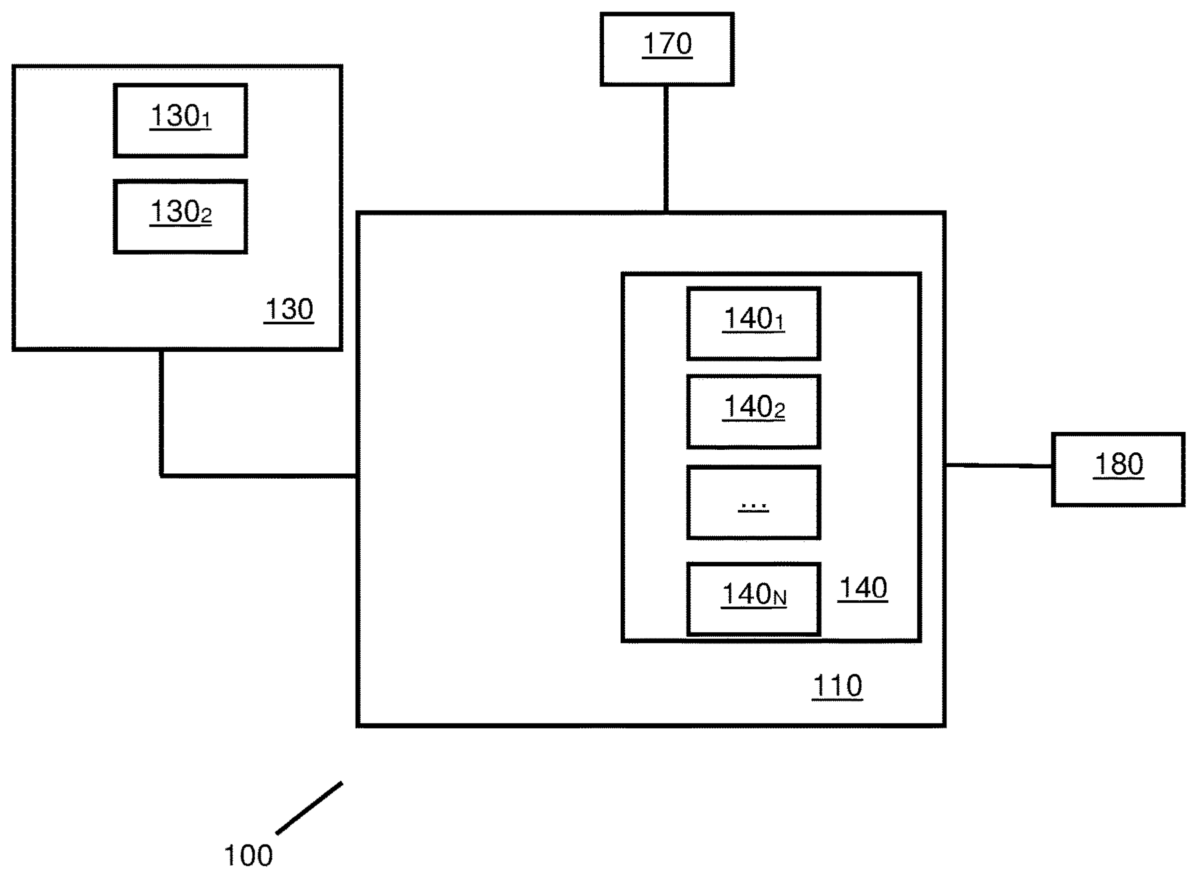
FIG. 1 illustrates a generalized block diagram of a system in accordance with certain embodiments of the presently disclosed subject matter.

Bearing this in mind, attention is drawn to FIG. 1 illustrating a functional block diagram of a (computerized) system 100 in accordance with certain embodiments of the presently disclosed subject matter.

System 100 includes a processor and memory circuitry (PMC) 110. PMC 110 includes a processor (not shown separately) and a memory (not shown separately). The processor of PMC 110 can be configured to execute several functional modules in accordance with computer-readable instructions implemented on a non-transitory computer-readable memory comprised in the PMC. Such functional modules are referred to hereinafter as comprised in the PMC.

System 100 is operable to receive data 130 from a third party (e.g. from another computer or server), through wire and/or wireless communication. According to some embodiments, data 130 includes data informative of one or more recorded sessions (as explained hereinafter, the session can be a live recorded session, and the system can process at least part of the data 130, or all of the data 130, in real time or quasi real time, or the session can be first fully recorded, and the system can process the data 130 offline). Each session includes an audio content $\mathbf{130}_1$ (e.g. digitized audio content recorded during the session). In some embodiments, the session can include a video content $130_2$ (recorded during the session). A session generally involves a plurality of participants, who interact socially during an oral conversation.

According to some embodiments, system 100 includes a machine learning module 140. As explained hereinafter, the machine learning module 140 is trained to determine data $D_{dominance}$ informative of the dominance of at least one participant in a session, based on features derived from the audio content $130_1$ of the session.

The machine learning module 140 can be implemented e.g. by PMC 110, and embodiments of training/usage of the machine learning module 140 will be described hereinafter.

According to some embodiments, system 100 includes a plurality of machine learning modules 140 (see machine learning modules $140_1$, $140_2$, . . . , $140_N$). Each machine learning module is trained to determine data $D_{dominance}$, as mentioned above.

According to some embodiments, the machine learning modules 140 include one or more deep neural networks (DNN).

By way of a non-limiting example, the layers of the DNN can be organized in accordance with Convolutional Neural Network (CNN) architecture, Recurrent Neural Network architecture (e.g. Long Short Term Memory network architecture), Recursive Neural Networks architecture, Generative Adversarial Network (GAN) architecture, Graph Neural Networks (GNN), or otherwise. Optionally, at least some of the layers can be organized in a plurality of DNN subnetworks. Each layer of the DNN can include multiple basic computational elements (CE), typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of DNN can be initially selected prior to training, and can be further iteratively adjusted or modified during training to achieve an optimal set of weighting and/or threshold values in a trained DNN. After each iteration, a difference (also called a loss function) can be determined between the actual output produced by DNN and the target output associated with the respective training set of data. The difference can be referred to as an error value. Training can be determined to be complete when a cost or loss function indicative of the error value is less than a predetermined value, or when a limited change in performance between iterations is achieved. Optionally, at least some of the DNN subnetworks (if any) can be trained separately, prior to training the entire DNN.

According to some embodiments, system 100 is operable to receive labelled data (hereinafter label 170). The label 170 can be generated based on an input of an operator. The label is informative of the dominance of one or more participants in a session. For example, the session may involve two participants, and an operator provides a score indicative of the dominance of each participant. In another example, the operator indicates the participant who is the most dominant with respect to the other participants. In some embodiments, for each fraction of time of the session, the operator provides a label indicative of the dominance of the one or more participants. Indeed, dominance among the participants can evolve over time in the session. The label 170 can therefore include a plurality of scores, each score being associated with a different period of time of the session.

As explained hereinafter, system 100 can output data $D_{dominance}$ (see reference 180) informative of the dominance of a participant in a session with respect to one or more other participants of the session. This reflects the relative dominance of the participant with respect to the other participants(s) of the session.

Dominance can correspond to one speaker's tendency to control the other speaker's conversational actions over the course of an interaction. Data $D_{dominance}$ (informative of this dominance) can be measured over each fraction of time of the session, and/or over the whole session (e.g. as an aggregated/averaged dominance over the whole session). As explained hereinafter, various features of the audio content can be used to characterize dominance of a speaker.

Note that data $D_{dominance}$ output by the machine learning module 140 reflects the labels 170 provided by one or more operators in a training phase of the machine learning module 140. The operator defines, for one or more training sessions, who is/are the dominant participants (or attributes a score reflecting the level of dominance), and this definition is used to generate the label. The training of the machine learning module 140 uses these labels, and therefore includes, at least partially, supervised learning. The machine learning module 140 learns from these labels how to classify dominance of the participants based on the audio content of a session, so as to be able to generate, in an automatic and computerized manner, data $D_{dominance}$ during a prediction phase. The dominance as classified by the machine learning module 140 therefore reflects the input of the operator provided during a training phase of the machine learning module 140.

Figure 2:
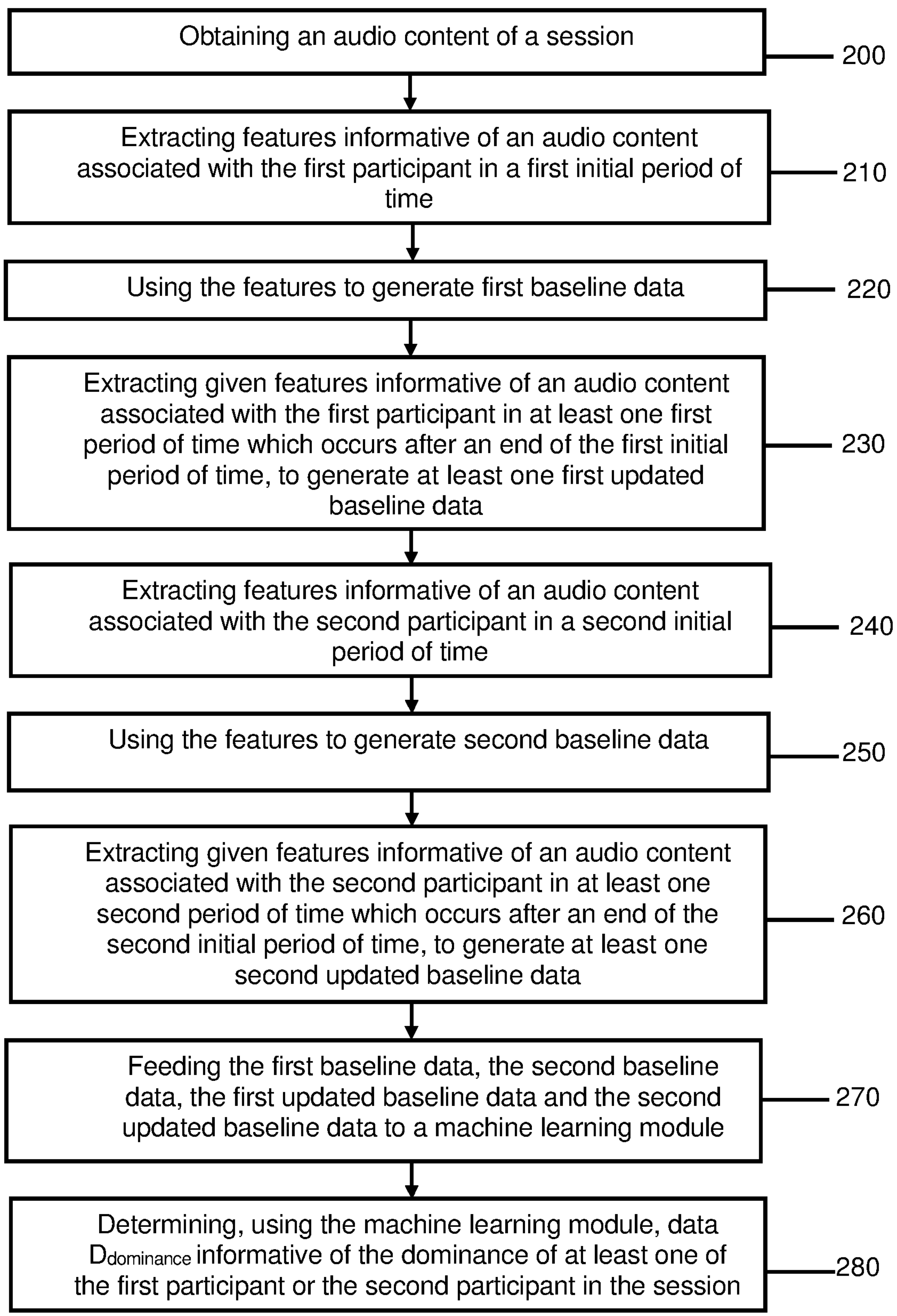
FIG. 2 illustrates a generalized flow-chart of a method of determining data informative of the dominance (relative dominance) of one or more participants of the session, based on the audio content of the session, using a machine learning module.

Attention is drawn to FIG. 2.

As explained above, a session includes an audio content (see $130_1$ in FIG. 1). In some embodiments, the audio content includes a plurality of audio contents, one per participant of the session (each participant is associated with a different channel in the audio content).

In some embodiments, additional metadata can be associated with the session (e.g. periods of time in which each participant is speaking, identity of participants, etc.). The method of FIG. 2 includes (operation 200) obtaining at least part of the content associated with the recorded session, including the audio content of the session.

According to some embodiments, the method of FIG. 2 includes (operation 210), for a first participant of the session, extracting features informative of an audio content associated with the first participant in a first initial period of time of the session. In some embodiments, each participant is associated with a different audio channel (e.g., in a tele-meeting). In some embodiments, the participants can be located in the same area, and the session can be recorded. In order to identify the audio content associated with each participant, a speaker diarization algorithm (implemented e.g., by the PMC 110) can be used.

Figure 3A:
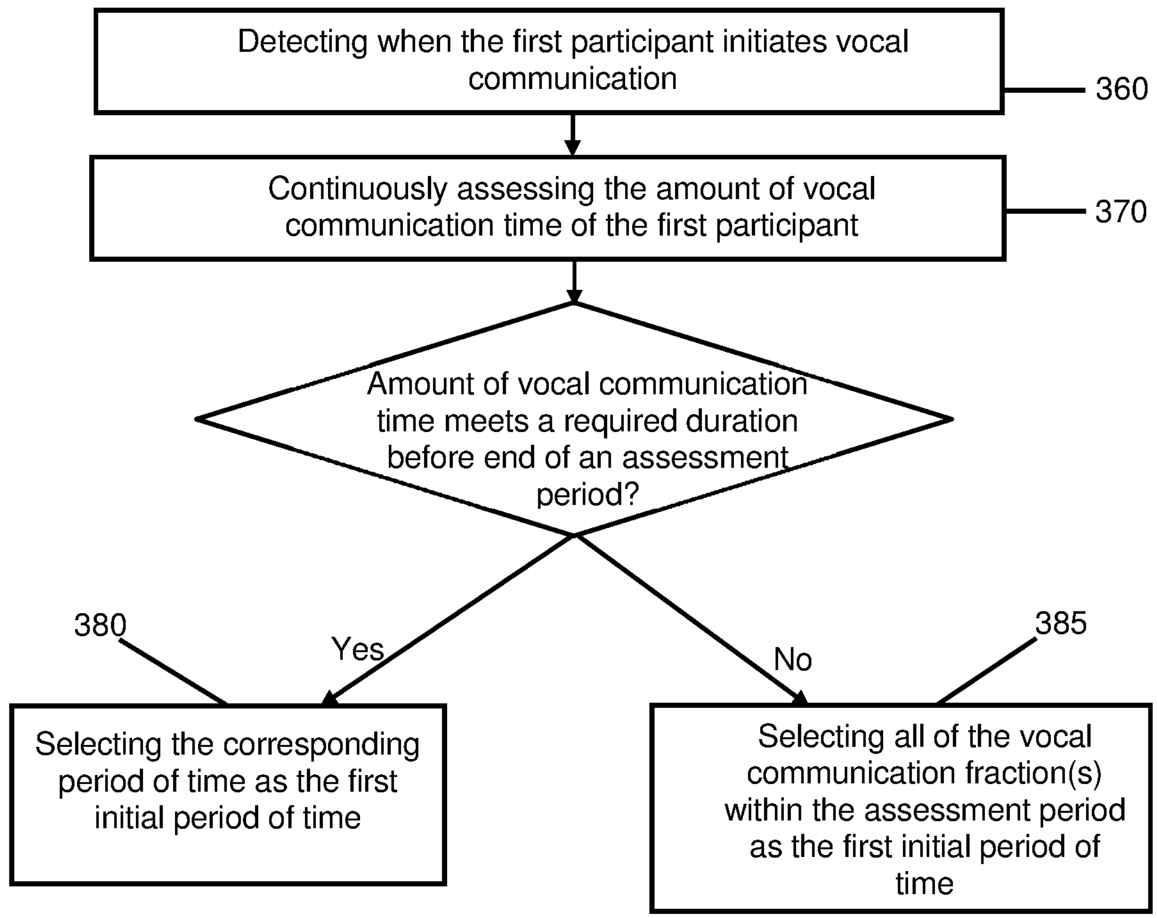
FIGS. 3A to 3E illustrate examples of determining a first initial period of time and associated first baseline data, for a first participant.
Figure 3B:
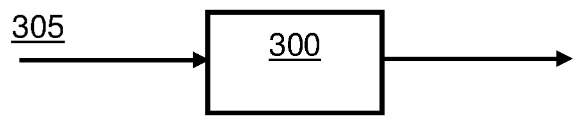

The first initial period of time can be determined as explained with reference to FIGS. 3A to 3C. The audio content 305 associated with the first participant can be fed to a voice activity detector 300. The voice activity detector can be implemented e.g., by the PMC 110. The voice activity detector 300 can include instructions enabling execution, by the PMC 110, of one or more available voice activity detection algorithms. The voice activity detector 300 detects (see operation 360 in FIG. 3A) when the first participant starts to produce vocal communication (see time $T_{0/1}$ in FIGS. 3C to 3E). Note that this vocal communication can include e.g. speech (words and/or speech sounds) and/or sounds (such as a sound expressing approval or disapproval—this example being not limitative).

When this detection occurs, the amount of vocal communication time of the first participant is continuously assessed (see operation 370 in FIG. 3A) over a period of time (assessment period) which starts from $T_{0/1}$ and ends at $T_{max}$.

In particular, it is attempted to find a period of time (within the assessment period) in which the amount of vocal communication time of the first participant meets a required duration ΔT (e.g. the first participant produces a vocal communication during a period of ΔT).

For example, it can be attempted to find an amount of vocal communication time which has a duration ΔT of 30 seconds (this value being not limitative).

Note that the period of time may be continuous (e.g. the participant communicates continuously in the duration ΔT), or discontinuous (the period of time in which the first participant communicates includes a plurality of fractions of the assessment period, wherein at least two fractions are separated by a silence of the first participant, with an accumulated duration of all the fractions of ΔT).

In other words, the method searches for the period of time of duration ΔT in which the first participant communicates, within a period of time $[T_{0/1};T_{end}]$(assessment period) of a duration $\Delta T_{max}$ (for example, $\Delta T_{max}$=2 minutes, this is not limitative).

When the accumulated speech time of the first participant reaches ΔT within the interval $[T_{0/1};T_{end}]$, the method stops and selects the corresponding period of time as the first initial period of time (operation 380).

Figure 3C:
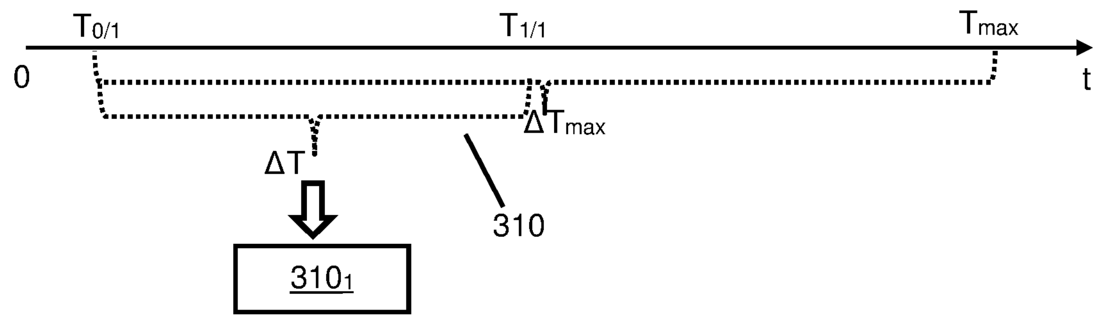

In the example of FIG. 3C, the first initial period of time 310 is continuous (from $T_{0/1}$ to $T_{1/1}$) and has the required duration $\Delta T_{max}$ within the interval $[T_{0/1};T_{max}]$.

Figure 3D:
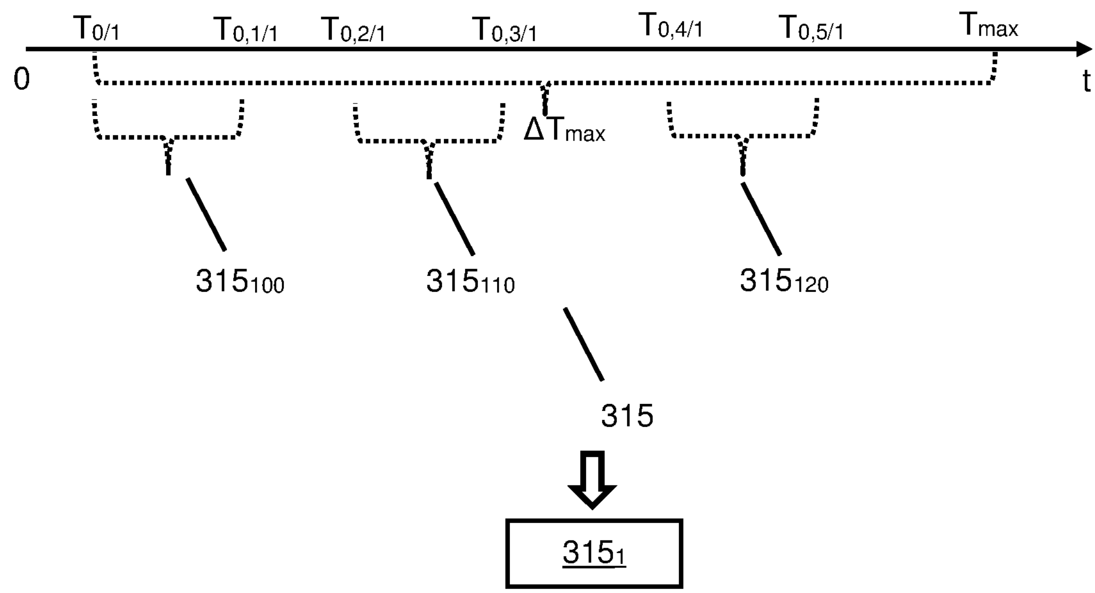

In the example of FIG. 3D, the first initial period of time 315 is discontinuous, since it includes non-adjacent fractions $\mathbf{315}_{100}$ (from $T_{0/1}$ to $T_{0,1/1}$), $\mathbf{315}_{110}$ (from $T_{0,2/1}$ to $T_{0,3/1}$) and $\mathbf{315}_{120}$ (from $T_{0,4/1}$ to $T_{0,5/1}$). The sum of the duration of each of the three fractions $\mathbf{315}_{100}$, $\mathbf{315}_{110}$ and $\mathbf{315}_{120}$ has the required duration ΔT. As mentioned above, the first initial period of time 315 is within the interval $[T_{0/1};T_{max}]$. Note that the fact that the discontinuous first initial period of time 315 includes three non-adjacent segments is not limitative, and it could include two (or more) non-adjacent segments.

Figure 3E:
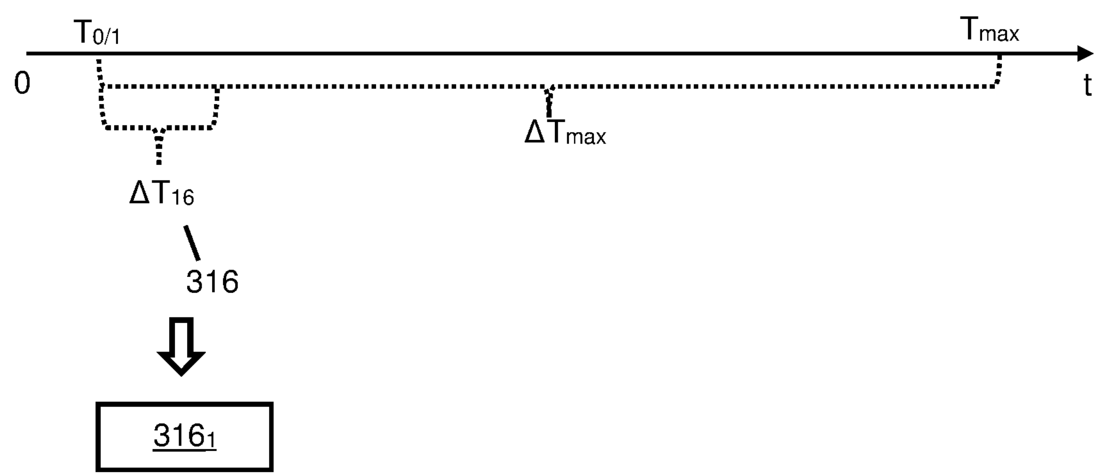

If the accumulated vocal communication time of the participant does not reach the required duration ΔT within the interval $[T_{0/1};T_{end}]$, the method selects (see operation 385) the period of time corresponding to all fractions(s) in which the participant produces vocal communication as the first initial period of time (although the accumulated vocal communication time is shorter than ΔT). As already mentioned above, the first initial period of time can be continuous or discontinuous. A non-limitative example of this situation is illustrated in FIG. 3E, in which the first initial period of time 316 has a duration $\Delta T_{16}$ which is shorter than the required duration ΔT. The case in which the first initial period of time 316 is discontinuous is not illustrated.

The method of FIG. 2 includes (operation 220), for the first participant of the session, using the features extracted at operation 210 to generate first baseline data. First baseline data reflect the behaviour of the first participant at the beginning of his intervention in the session. It can include e.g. a vector and/or a matrix of data. It can be viewed e.g. as reflecting "the first impression" made by the first participant during his oral intervention in the session. Embodiments for generating first baseline data will be described hereinafter.

For example, in FIG. 3C, if the first initial period of time is selected as period of time 310, first baseline data $\mathbf{310}_1$ is generated. Similarly, if the first initial period of time is selected as period of time 315 (see FIG. 3D), first baseline data $\mathbf{315}_1$ is generated. Similarly, if the first initial period of time is selected as period of time 316 (see FIG. 3E), first baseline data $\mathbf{316}_1$ is generated.

The method of FIG. 2 includes (operation 230), for at least one first period of time (see reference $\mathbf{400}_1$ in FIG. 4B) starting after an end of the first initial period of time, extracting given features informative of an audio content associated with the first participant in the first period of time. Note that the example of FIG. 4B uses the first period of time determined in FIG. 3C, but this is not limitative, and it can use the first period of time determined e.g. in FIG. 3D or in FIG. 3E. The features extracted during the first period of time can be the same as the features extracted during the first initial period of time. This is however not mandatory.

Figure 4A:
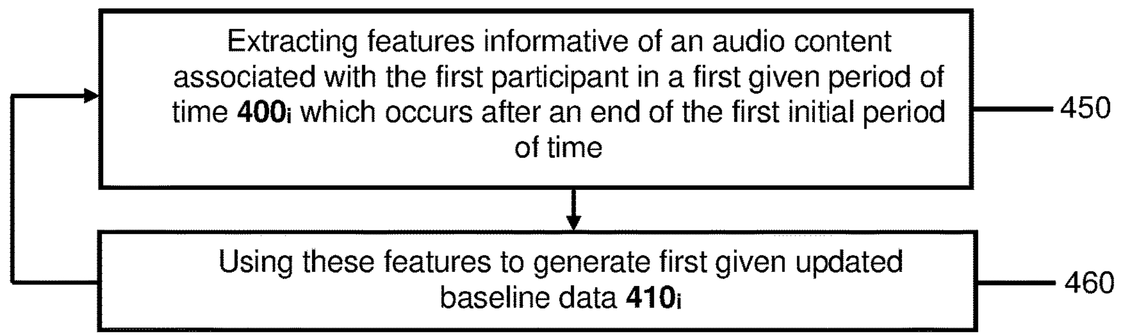
FIGS. 4A to 4C illustrate an example of determining first updated baseline data, for subsequent first periods of time.
Figure 4B:
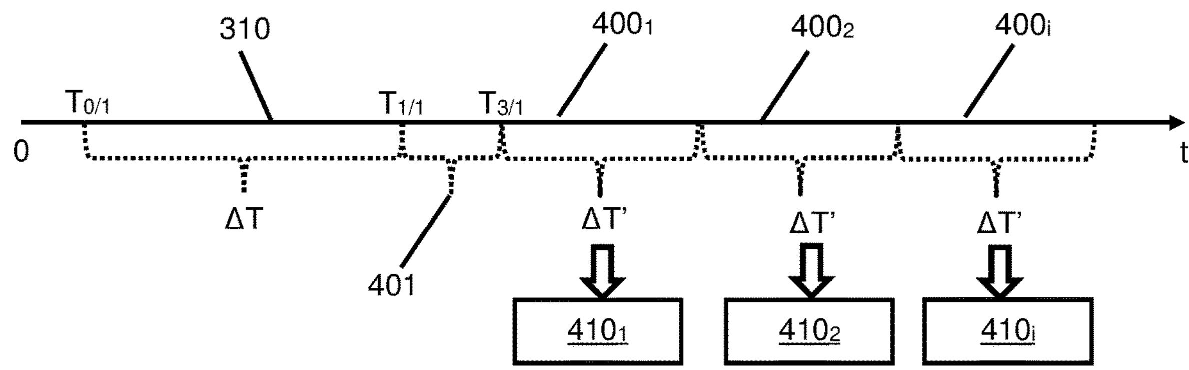
Figure 4C:
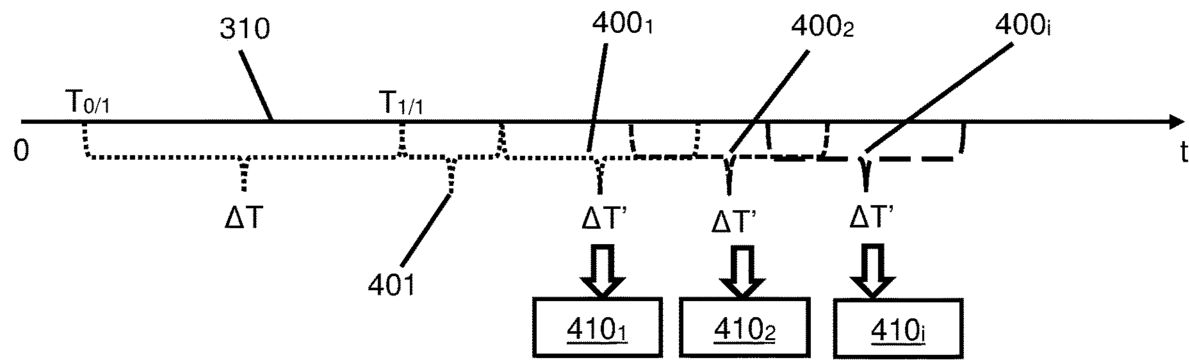

A non-limitative example of an implementation of operation 230 is depicted with reference FIGS. 4A to 4C. Assume that the first initial period of time (determined using the method of FIG. 3A) is noted 310. The first initial period of time has a duration ΔT and ends at time $T_{1/1}$. A first period of time $\mathbf{400}_1$ starts at time $T_{3/1}$ and has a predetermined duration ΔT'. In some embodiments, the first given period of time $\mathbf{400}_1$ starts after a waiting period 401 (e.g. of a few seconds) starting from time $T_{1/1}$. The waiting period 401 can be present when there is a silence (as detected by the voice activity detector 300) after the end of the first initial period of time 310. If the first participant still produces vocal communication after the end $T_{1/1}$ of the first initial period of time 310, then there is not waiting period 401.

In this first given period of time $\mathbf{400}_1$, features informative of an audio content associated with the first participant are extracted (operation 450). These features are used to generate first updated baseline data $\mathbf{410}_1$ (operation 460).

The first updated baseline data can be viewed as an update of the behaviour of the first participant during the session. Indeed, as mentioned above, the first baseline data reflects the first impression made by the first participant. However, over time, the behaviour of the first participant may change. Therefore, the first updated baseline data can be used to determine whether the behaviour of the first participant has changed with respect to his first contribution to the session.

The first updated baseline data can be generated repetitively over a plurality of first periods of time of the session.

Another first given period of time $\mathbf{400}_2$ is depicted in FIG. 4B. It can have the same duration as the first period of time $\mathbf{400}_1$ (this is however not mandatory). Given features informative of an audio content associated with the first participant in this first period of time $\mathbf{400}_2$ are extracted. The features extracted during the first period of time $\mathbf{400}_2$ can be the same as the features extracted during the first initial period of time 310 and/or during the first period of time $\mathbf{400}_1$. This is however not mandatory. These features are used to generate first updated baseline data $\mathbf{410}_2$. The method can be repeated to obtain, for each given first period of time $\mathbf{400}_i$ (starting after the end of the first initial period 310), given first updated baseline data $\mathbf{410}_i$.

In some embodiments, each first period of time $\mathbf{400}_i$ starts after an end of the previous first period of time $\mathbf{400}_{i-1}$. This is depicted in FIG. 4B.

In some embodiments, each first period of time $\mathbf{400}_1$ overlaps with the previous period of time $\mathbf{400}_{i-1}$. This is depicted in FIG. 4C. For example, the beginning of the first period of time $\mathbf{400}_2$ is within the previous first period of time $\mathbf{400}_1$.

In some embodiments, some of the first periods of time overlap with the previous first periods of time, and some first periods of time do not overlap with the previous first periods of time.

According to some embodiments, the first initial period of time has a duration ΔT which is longer than a duration ΔT' of each first period of time $\mathbf{400}_i$. This enables e.g. to provide more weight to the first impression made by the first participant than to the other contributions of the first participant during the session. According to some embodiments, the following relationship is met: $\Delta T \geq 1.5\Delta T'$. This is however not limitative.

Operations 210, 220 and 230 can be repeated for each participant of the session. FIG. 2 illustrates operations 240, 250 and 260 performed for a second participant of the session. Operations 240, 250 and 260 are similar (respectively) to operations 210, 220 and 230. Although FIG. 2 depicts these operations for two participants, it has to be noted that these operations can be performed for N participants, with N>2. In some embodiments, at least some of these operations can be performed in parallel. For example, the data can be computed in parallel for a plurality of participants.

In some embodiments, the data is determined online during the session (after the end of each relevant period of time). For example, after the first period of time $\mathbf{400}_1$, the first updated baseline data $\mathbf{410}_1$ is determined, after the first period of time $\mathbf{400}_2$, the first updated baseline data $\mathbf{410}_2$ is determined, etc. In other embodiments, the data is determined offline after recording of the whole session.

At operation 240, features informative of an audio content associated with the second participant in a second initial period of time are extracted. The second initial period of time can be determined similarly to the first initial period of time (as explained with reference to FIGS. 3A to 3E). The difference is that the second initial period of time is determined for the second participant whereas the first initial period of time is determined for the first participant.

Note that the second initial period of time 505 (see FIG. 5A) can start at a time $T_{0/2}$ which differs from the time $T_{0/1}$ at which the first initial period 310 of time starts. This is due to the fact that the second participant can start producing vocal communication at a different instant than the first participant.

At operation 250, the features extracted at operation 240 are used to generate second baseline data $\mathbf{505}_1$. Second baseline data $\mathbf{505}_1$ can be viewed e.g. as reflecting "the first impression" made by the second participant during his oral intervention in the session.

The duration of the first initial period of time and of the second initial period of time can be the same, but this is not mandatory.

The method of FIG. 2 includes (operation 260), for at least one second period of time (see reference $\mathbf{500}_1$) starting after an end of the second initial period of time 505, extracting given features informative of an audio content associated with the second participant in the second period of time. The features extracted during the second period of time can be the same as the features extracted during the second initial period of time 505. This is however not mandatory.

The second period of time $\mathbf{500}_1$ starts after an end $T_{1/2}$ of the second initial period of time 505.

For each given second period of time $\mathbf{500}_1$ of a plurality of second periods of time ($\mathbf{500}_1$, $\mathbf{500}_2$, etc.), given features informative of an audio content associated with the second participant in the given second period of time can be extracted to generate given second updated baseline data $\mathbf{510}_i$.

In some embodiments, each given first period of time $\mathbf{400}_i$ matches a corresponding given second period of time $\mathbf{500}_i$ according to a synchronization criterion. The synchronization criterion can define that the amount of overlap in time between the first period of time $\mathbf{400}_i$ and the second period of time $\mathbf{500}_i$ is above a threshold. In some embodiments, each first period of time $\mathbf{400}_i$ and each corresponding second period of time $\mathbf{500}_i$ start at the same time and end at the same time.

According to some embodiments, the second initial period of time has a duration ΔT which is longer than a duration ΔT' of each second period of time $\mathbf{500}_i$. This enables e.g. to provide more weight to the first impression made by the second participant than to the other contributions of the second participant during the session. According to some embodiments, the following relationship is met: $\Delta T \geq 1.5\Delta T'$. This is however not limitative.

The method of FIG. 2 further includes (operation 270) feeding the first baseline data (e.g. $\mathbf{310}_1$), the second baseline data (e.g. $\mathbf{505}_1$), the first updated baseline data (or a plurality of first updated baseline data $\mathbf{400}_1, \ldots, \mathbf{400}_i$) and the second updated baseline data (or a plurality of second updated baseline data $\mathbf{500}_1, \ldots, \mathbf{500}_i$) to a machine learning module 140.

The machine learning module 140 generates (operation 280), based on this input, data $D_{dominance}$ informative of the dominance of at least one of the first participant or the second participant in the session.

Since the machine learning module has been fed (inter alia) with a given first updated baseline data (e.g. $\mathbf{410}_i$) informative of a given first period of time (e.g. $\mathbf{400}_i$) and a given second updated baseline data (e.g. $\mathbf{510}_i$) informative of a given second period of time (e.g. $\mathbf{500}_i$), data $D_{dominance}$ is informative of the dominance of at least one of the first participant or the second participant in a period of time including at least part of the given first period of time and/or at least part of the given second period of time. In the non-limitative example of FIG. 5A, the machine learning module 140 outputs data $D_{dominance/1}$ for the period of time $\mathbf{400}_1/\mathbf{500}_1$ (in this example, these two periods are identical), data $D_{dominance/2}$ for the period of time $\mathbf{400}_2/\mathbf{500}_2$ (in this example, these two periods are identical) and more generally data $D_{dominance/i}$ for the period of time $\mathbf{400}_1/\mathbf{500}_1$ (in this example, these two periods are identical). As explained above, in some embodiments, data $D_{dominance/1}$ to $D_{dominance/i}$ can be output in real time or quasi real time (after the end of each period of time $\mathbf{400}_i/\mathbf{500}_i$). According to some embodiments, $D_{dominance}/1$ to $D_{dominance/i}$ is generated offline, after the whole session has been recorded.

In some embodiments, data $D_{dominance}$ can include e.g. a score, which indicates, for each participant, his level of dominance with respect to the other participant(s). For example, the first participant gets a score of 80% and the second participant gets a score of 20%. Note that this can be generalized to N participants, with N>2, in which each participant gets a score informative of his dominance with respect to all of the other N−1 participants.

In some embodiments, data $D_{dominance}$ can include identification of one of the participants who has been identified as the most dominant with respect to the other participants (this participant can be identified as the one who has the highest score of dominance) in a given period of time. For example, the first participant has been identified as the most dominant with respect to the second participant. More generally, for N participants, one participant can be selected as the most dominant with respect to the other N−1 participants.

Figure 5A:
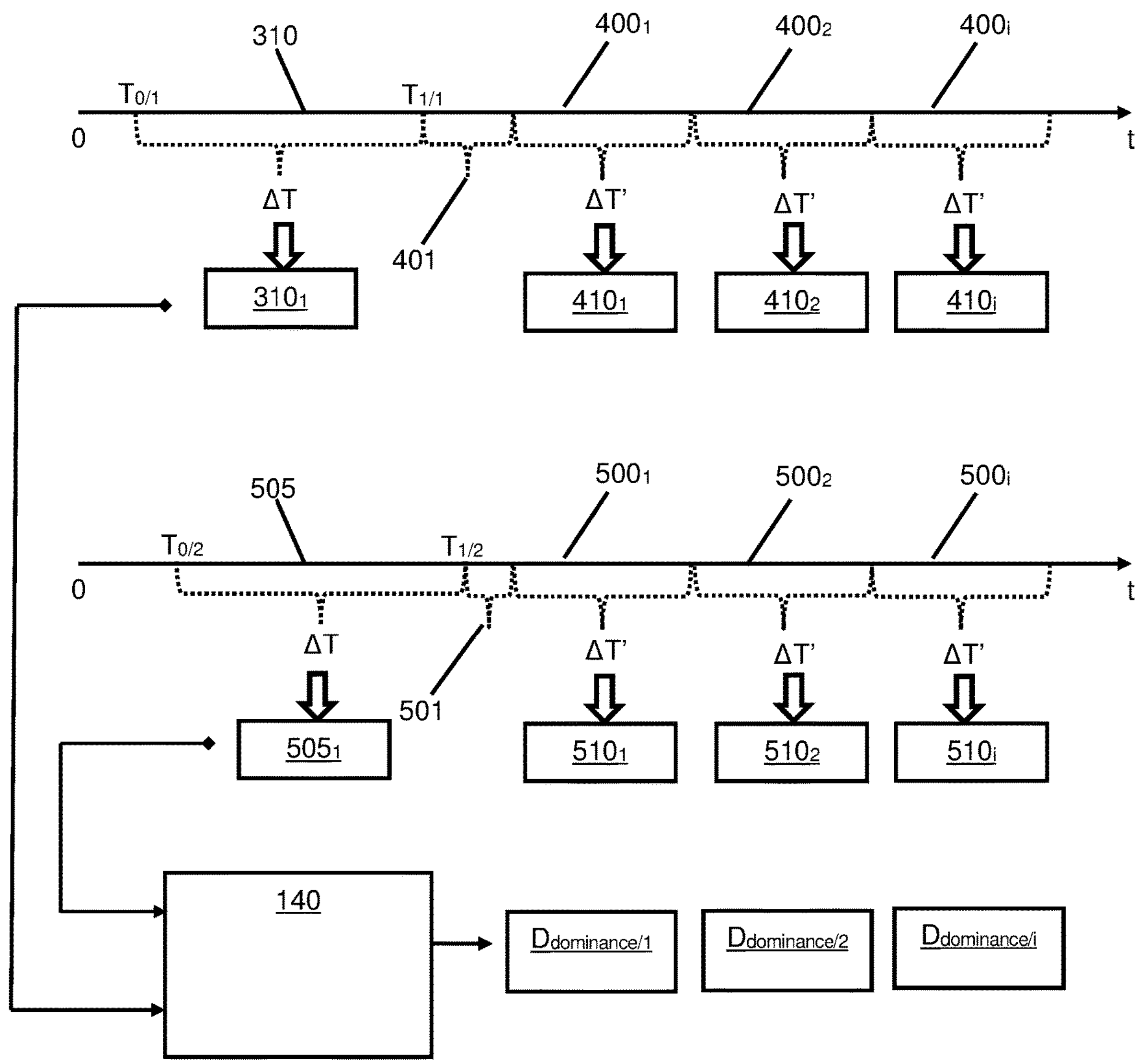
FIG. 5A illustrates an example of determining relative dominance of one or more participants based on features extracted from the audio content of the session.

As visible in FIG. 5A, the machine learning module 140 can output, for each given period of time of plurality of periods of time of the session, data $D_{dominance}$ indicative of the participant who is the most dominant with respect to the one or more other participants of the session during this given period of time (note that $D_{dominance}$ can also include a score attributed to each participant, indicative of the level of relative dominance of this participant with respect to the other participants).

Figure 5B:
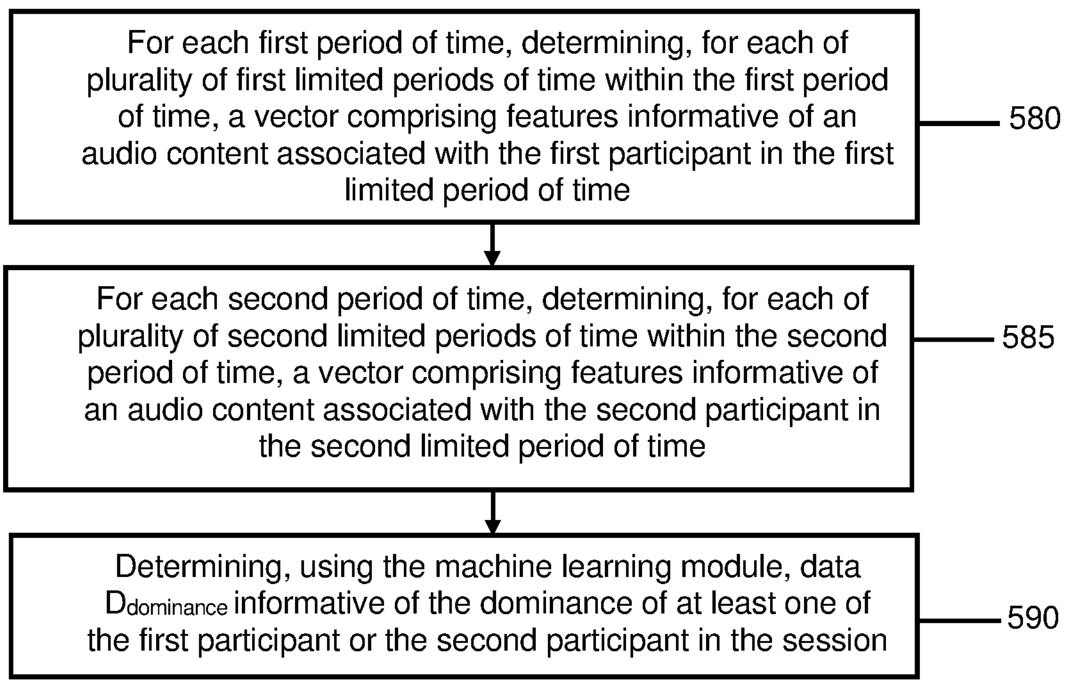
FIG. 5B illustrates a generalized flow-chart of a method of determining dominance feature vectors usable as an input of a machine learning module trained to determine dominance of participants in a session.
Figure 5C:
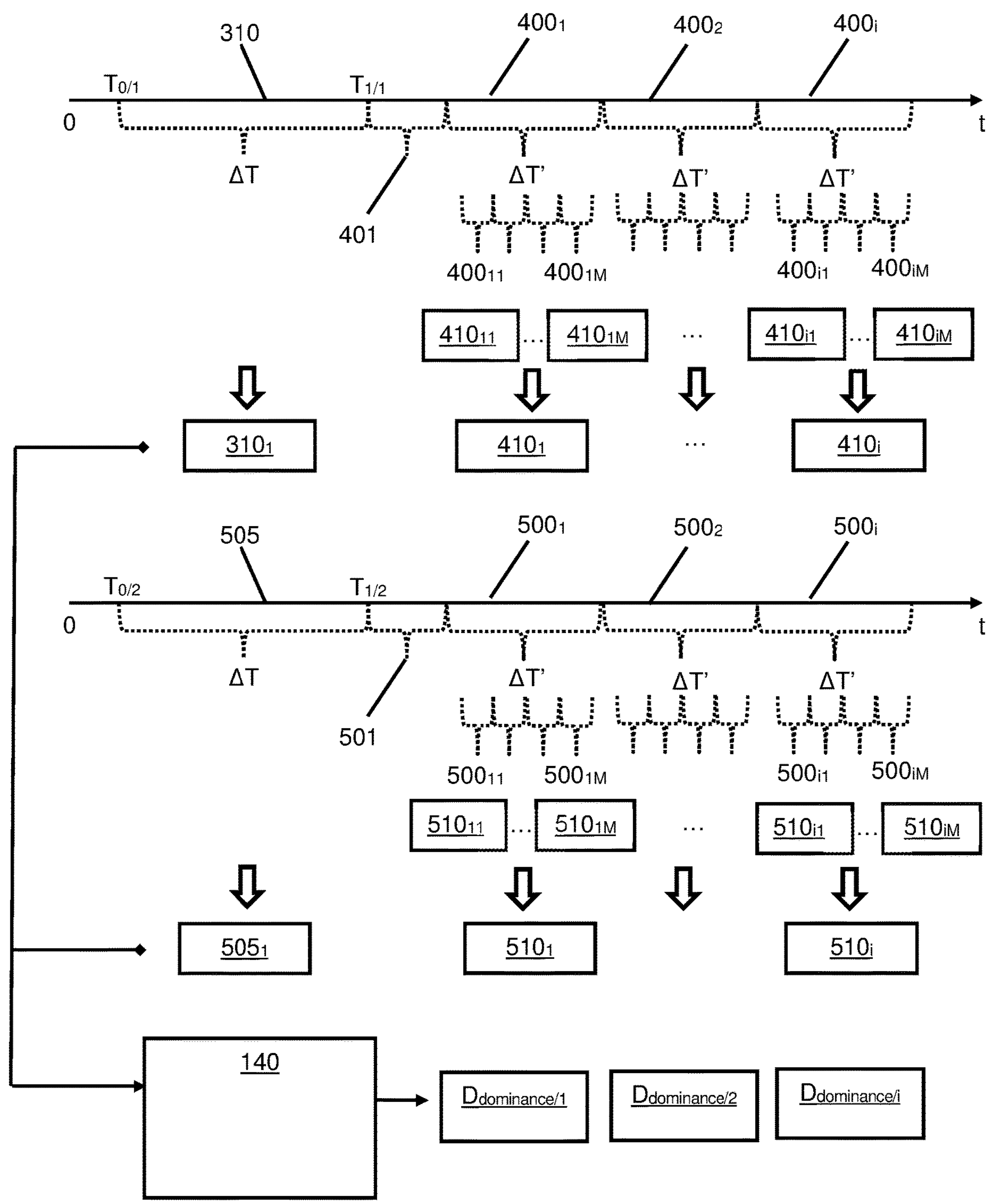
FIG. 5C illustrates an example using the dominance feature vectors generated by the method of FIG. 5B.

Attention is now drawn to FIGS. 5B and 5C.

According to some embodiments, the machine learning module 140 is fed with additional data in order to determine data $D_{dominance}$.

Assume that for the first participant, for each of a plurality of first periods of time (see $\mathbf{400}_1$, $\mathbf{400}_2$, $\mathbf{400}_i$), first updated baseline data (see $\mathbf{410}_1$, $\mathbf{410}_2$, $\mathbf{410}_i$), has been generated, as explained above.

As explained hereinafter with reference to FIGS. 6A to 6C, in order to generate the first updated baseline data (see e.g. $\mathbf{410}_1, \ldots, \mathbf{410}_i$), a plurality of vectors (called hereinafter dominance feature vectors) can be first generated and then aggregated to generate the first updated baseline data (see e.g. $\mathbf{410}_1, \ldots, \mathbf{410}_i$) informative of features of the audio content in a first period of time (see e.g. $\mathbf{400}_1$, $\mathbf{400}_2$, $\mathbf{400}_i$).

In the non-limitative example of FIG. 5C, a plurality of dominance feature vectors $\mathbf{410}_{11}$ to $\mathbf{410}_{1M}$ (with M≥2) is generated, each dominance feature vector being informative of a limited period of time (see $\mathbf{400}_{11}$ to $\mathbf{400}_{1M}$) of the first period of time $\mathbf{400}_1$. Similarly, a plurality of dominance feature vectors $\mathbf{410}_{i1}$ to $\mathbf{410}_{iM}$ (with M>2) is generated, each dominance feature vector being informative of a first limited period of time (see $\mathbf{400}_{i1}$ to $\mathbf{400}_{1M}$) of the first period of time $\mathbf{400}_i$. Each first limited period of time is at least partially within a corresponding first period of time and has a duration which is shorter than the duration of the corresponding first period of time.

In some embodiments, the first limited periods of time can have an overlap between them. This is however not limitative.

Each dominance feature vector can be viewed as a snapshot of the behaviour of the first participant, within a limited period of time.

As explained hereinafter with reference to FIGS. 6A to 6C, in order to generate the second updated baseline data (see e.g. $\mathbf{510}_1, \ldots, \mathbf{510}_i$), a plurality of vectors (called hereinafter dominance feature vectors) can be first generated and then aggregated to generate the second updated baseline data (see e.g. $\mathbf{510}_1, \ldots, \mathbf{510}_i$) informative of features of the audio content in a second period of time (see e.g. $\mathbf{500}_1$, $\mathbf{500}_2$, $\mathbf{500}_i$).

In the non-limitative example of FIG. 5C, a plurality of dominance feature vectors $\mathbf{510}_{11}$ to $\mathbf{510}_{1M}$ (with M≥2) is generated, each dominance feature vector being informative of a limited period of time (see $\mathbf{500}_{11}$ to $\mathbf{500}_{1M}$) of the second period of time $\mathbf{500}_1$. Similarly, a plurality of dominance feature vectors $\mathbf{510}_{i1}$ to $\mathbf{510}_{1M}$ (with M≥2) is generated, each dominance feature vector being informative of a second limited period of time (see $\mathbf{500}_{i1}$ to $\mathbf{500}_{1M}$) of the second period of time $\mathbf{500}_i$. Each second limited period of time is at least partially within a corresponding second period of time and has a duration which is shorter than the duration of the corresponding second period of time.

In some embodiments, the second limited periods of time can have an overlap between them. This is however not limitative.

Each dominance feature vector can be viewed as a snapshot of the behaviour of the second participant, within a limited period of time.

Note that if during a given limited first (respectively second) period of time, the first (respectively second) participant did not produce any vocal communication (this can be detected e.g. by the voice activity detector 300), then an empty dominance feature vector can be generated, which can be disregarded in subsequent processing steps.

Note that although FIG. 5C does not represent dominance feature vectors with respect to the first initial baseline data $\mathbf{310}_1$ and to the second initial baseline data $\mathbf{505}_1$, it will be explained with reference to FIGS. 6A to 6C that dominance feature vectors are also generated in order to determine the first initial baseline data $\mathbf{310}_1$ and the second initial baseline data $\mathbf{505}_1$.

Each first limited period of time can be synchronized with a corresponding second limited period of time according to a synchronization criterion. The synchronization criterion can define that the amount of overlap in time between the two periods is above a threshold, or that the two periods start at the same time and end at the same time.

For example, the first limited period of time $\mathbf{400}_{11}$ meets the synchronization criterion with the second limited period of time $\mathbf{500}_{11}$, the first limited period of time $\mathbf{400}_{1M}$ meets the synchronization criterion with the second limited period of time $\mathbf{500}_{1M}$, etc.

The method further includes feeding, to the machine learning module 140:

- the first baseline data (e.g. $\mathbf{310}_1$),
- the second baseline data (e.g. $\mathbf{505}_1$),
- for each first period of time (e.g. $\mathbf{400}_i$), the first updated baseline data (e.g. $\mathbf{410}_i$) and at least one dominance feature vector $VF_1$ (e.g. one of the vectors $\mathbf{410}_{11}$ to $\mathbf{410}_{iM}$) associated with a first limited period of time within the first period of time; and
- for each second period of time (e.g. $\mathbf{500}_i$), the second updated baseline data (e.g. $\mathbf{510}_i$) and at least one dominance feature vector $VF_2$ (e.g. one of the vectors $\mathbf{510}_{11}$ to $\mathbf{510}_{iM}$) associated with a second limited period of time within the second period of time.

In some embodiments, for each given first (respectively second) period of time, the dominance feature vector associated with the last of the first (respectively second) limited periods of time within the given first (respectively second) period of time is fed to the machine learning module 140. For example, for the first period of time $\mathbf{400}_1$, the dominance feature vector $\mathbf{410}_{1M}$ is fed to the machine learning module

140, since dominance feature vector $\mathbf{410}_{1M}$ corresponds to the last limited period of time $\mathbf{400}_{1M}$ included in the first period of time $\mathbf{400}_1$.

The machine learning module 140 generates, based on this input, data $D_{dominance}$ informative of the dominance of at least one of the first participant or the second participant in the session.

In the non-limitative example of FIG. 5C, the machine learning module 140 outputs $D_{dominance/1}$ for the period of time $\mathbf{400}_1/\mathbf{500}_1$ (in this example these two periods are identical), $D_{dominance}/2$ for the period of time $\mathbf{400}_2/\mathbf{500}_2$ (in this example these two periods are identical) and more generally $D_{dominance/i}$ for the period of time $\mathbf{400}_1/\mathbf{500}_1$ (in this example these two periods are identical).

Figure 6A:
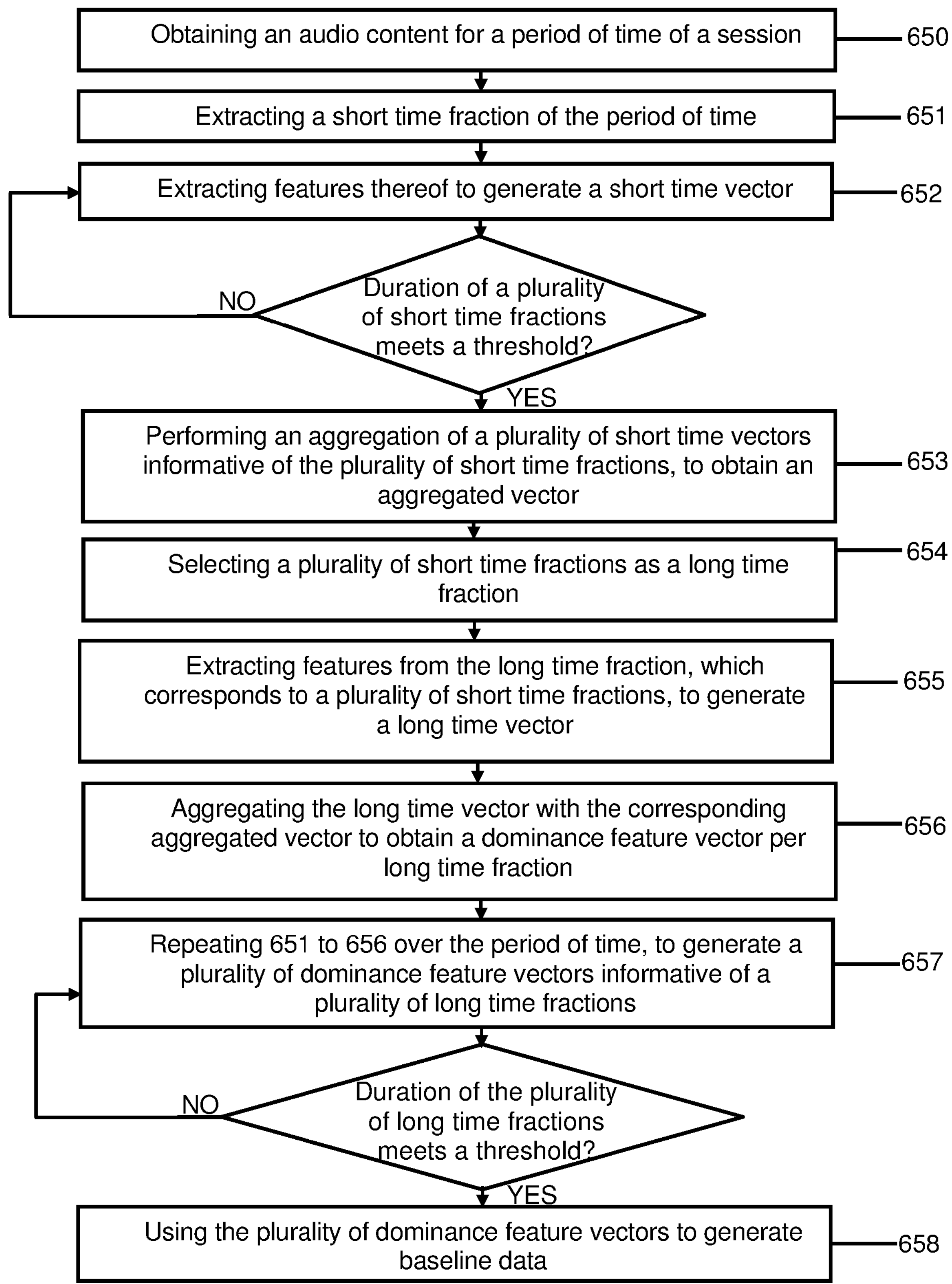
FIG. 6A illustrates a generalized flow-chart of a method of determining baseline data (e.g., initial baseline data and/or updated baseline data). At least part of the method can be used also for determining dominance feature vectors.
Figure 6B:
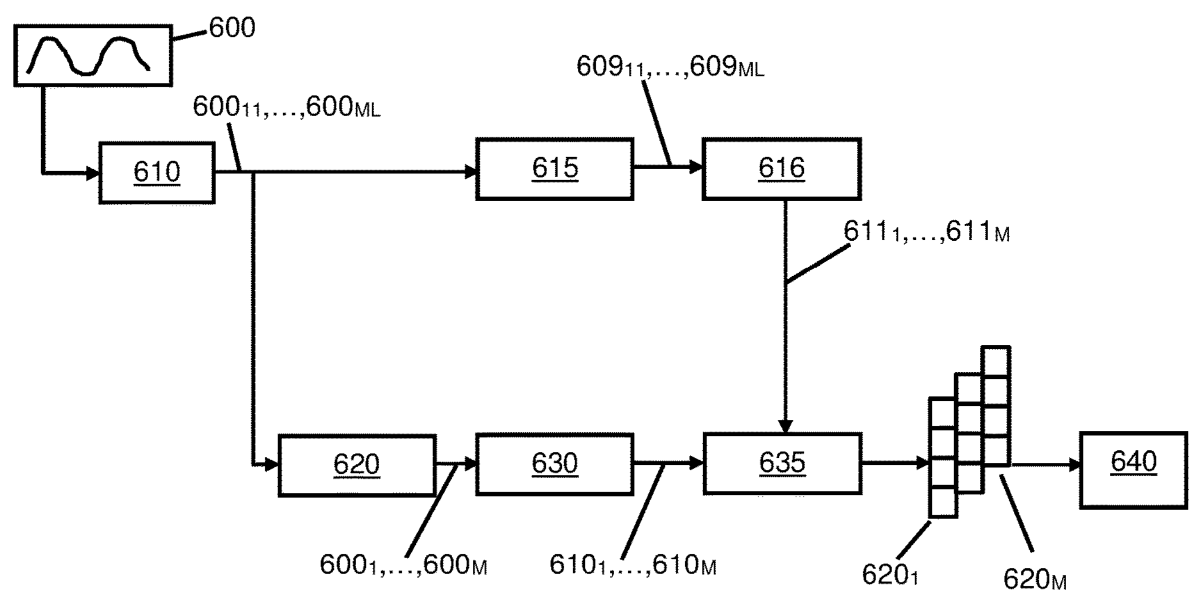
FIGS. 6B and 6C illustrate non-limitative examples using the data generated by the method of FIG. 6A.
Figure 6C:
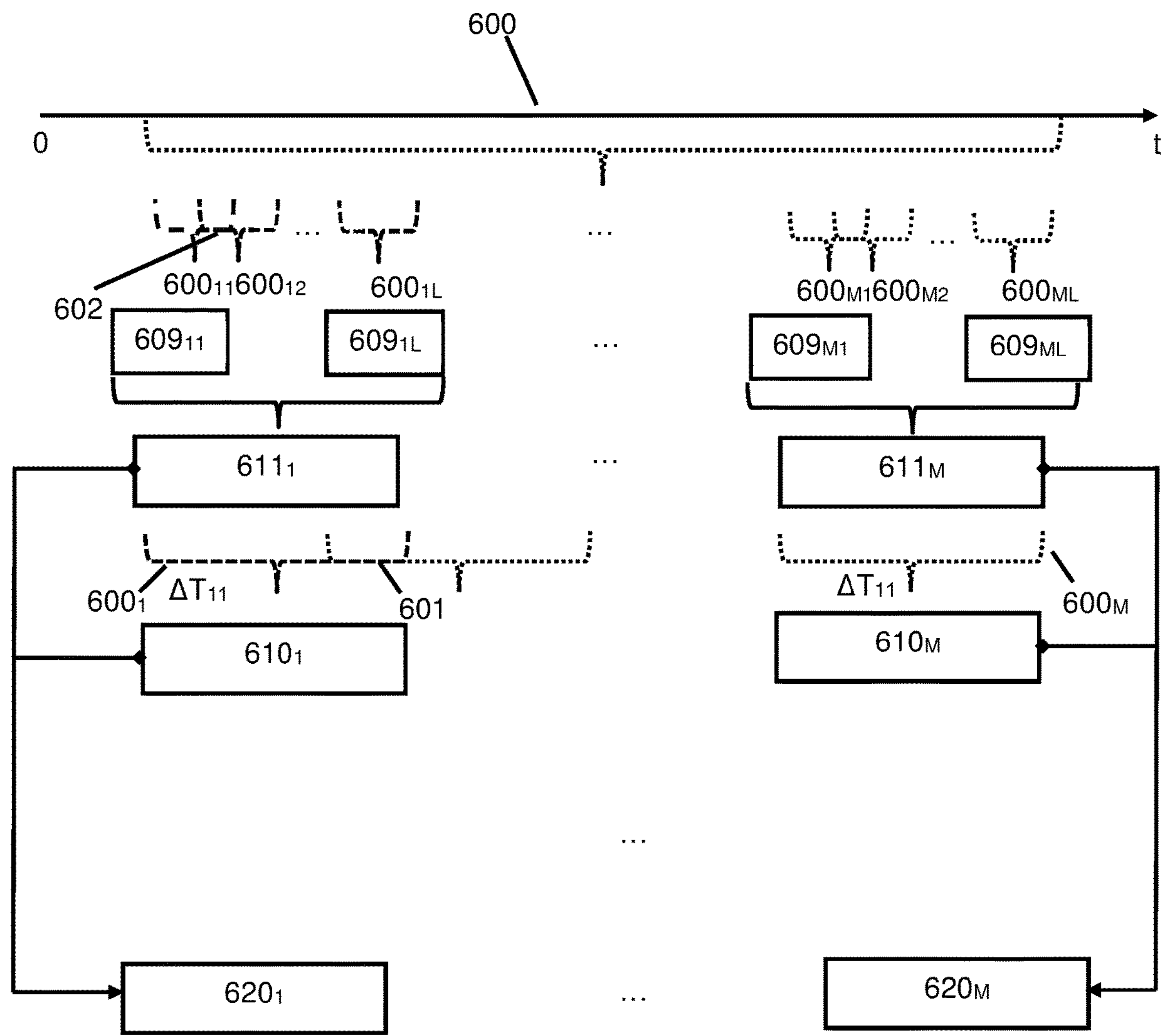

Attention is now drawn to FIGS. 6A to 6C, which depict methods of generating dominance feature vectors in order to generate baseline data (e.g. first baseline data $\mathbf{310}_1$, $\mathbf{315}_1$, or $\mathbf{316}_1$, or second baseline data $\mathbf{505}_1$, first updated baseline data $\mathbf{410}_1, \ldots \mathbf{410}_i$ and second updated baseline data $\mathbf{510}_1, \ldots \mathbf{510}_i$).

Assume that the audio content 600 associated with a given participant is received. Note that the audio content 600 can be received progressively in real time or quasi real time (and then can be processed in real time or quasi real time, or, if necessary, offline after the end of the session), or can be received after recording of the whole session and processed offline (after the end of the session).

The audio content 600 is processed by a module 610 (which can be called e.g., short time fraction extractor, which can be implemented by the PMC 110), in order to extract, from the period of time 600, a short time fraction (operation 651) of the audio content. The short time fraction is also called a frame. The module 610 can store instructions executable by the PMC 110 to perform the required operations. In some embodiments, each short time fraction overlaps with the previous short time fraction (see overlap 602 in FIG. 6C). This is however not limitative, and the short time fractions of time may not overlap. In a non-limitative example, each short time fraction has a duration of 25 ms, with an overlap 602 with the previous short time fraction of 10 ms.

The audio content associated with the short time fraction is fed to another module 615, which can be implemented by the PMC 110. The module 615 can store instructions executable by the PMC 110 to perform the required operations. The module 615 extracts first features (which can be designated, for simplicity, as $STF_1$ or $STF_{1/init}$ for the first participant, and as $STF_2$ or $STF_{2/init}$ for the second participant) from this audio content for the corresponding participant. These features can be micro-level/low level audio features.

These features can include at least one of pitch, intensity, speech rate, loudness, etc. Non-limitative examples of algorithms used by the module 615 to determine these features include YAAPT pitch tracking, Cepstrum Pitch Determination, etc.

The module 615 uses the extracted features ($STF_1$ or $STF_{1/init}$ for the first participant, $STF_2$ or $STF_{2/init}$ for the second participant) to generate a vector (short time vector) for each short time fraction (operation 652). Each short time vector can include e.g., an aggregation (e.g. concatenation) of the different extracted features.

Operations 651 and 652 are repeated, thereby obtaining a plurality of short time fractions. When the total duration of the plurality of short time fractions meets a threshold (which can be predefined—for example 250 ms, this value being not limitative), an aggregation of the plurality of short time vectors is performed to generate an aggregated vector (operation 653).

In the example of FIG. 6C, assume that the duration of the short time fractions $\mathbf{600}_{11}$ (for which a short time vector $\mathbf{609}_{11}$ has been generated) to $\mathbf{600}_{1L}$ (for which a short time vector $\mathbf{609}_{1L}$ has been generated) meets the threshold. As a consequence, a module 616 can perform an aggregation of the short time vectors $\mathbf{609}_{11}$ to $\mathbf{609}_{1L}$ into an aggregated vector $\mathbf{611}_1$. The module 616 can store instructions executable by the PMC 110 to perform these operations. The aggregation can use e.g., concatenation, average, majority voting, mean, etc.

The method of FIG. 6C further includes selecting (operation 654) a plurality of short time fractions as a long time fraction (called limited period of time) of the audio content. The selected short time fractions can correspond to a plurality of short time fractions which have a total duration that meet the threshold (as mentioned above). In other words, the association/union of the selected short time fractions constitute the limited period of time (therefore the limited period of time has the same duration as the association/union of the selected short time fractions). This can be performed by module 620 (which can be called "long time fraction extractor"—this is not limitative). The module 620 can store instructions executable by the PMC 110 to perform the required operations.

In some embodiments, each limited period of time $\mathbf{600}_i$ (long time fraction) overlaps with the previous limited period of time $\mathbf{600}_{i-1}$ (long time fraction). This is however not limitative, and the limited periods of time may not overlap. In a non-limitative example, each limited period of time $\mathbf{600}_1$ to $\mathbf{600}_M$ has a duration $\Delta T_{11}$ of 250 ms, with an overlap 601 of 100 msec between consecutive limited periods of time. These values are not limitative.

The audio content associated with the limited period of time is fed to another module 630, which can be implemented by the PMC 110. The module 630 can store instructions executable by the PMC 110. The module 630 extracts second features (which can be designated, for simplicity, as $LTF_1$ or $LTF_{1/init}$ for the first participant, or as $LTF_2$ or $LTF_{2/init}$ for the second participant) from this audio content for the corresponding participant (operation 655). These features can correspond to macro-level/high-level audio features (as opposed to micro-level/low level audio features). Macro-level audio features are generally assessed over a longer period of time than micro-level/low level audio features. In particular, the module 630 computes the features over a (e.g. continuous) period of time corresponding to the majority of (or all of) the limited period of time (see $\mathbf{600}_1$ to $\mathbf{600}_M$).

In some embodiments, these features include speaking length (also called total speaking time), which corresponds to the duration (measured e.g. in seconds) in which the participant produces vocal communication in the corresponding limited period of time. The speaking length can be detected by the voice activity detector 300. The speaking length can correspond to the accumulated duration in which the participant produces a vocal communication in the corresponding limited period of time.

In some embodiments, these features include the total speaking energy (generally expressed without a unit). This can correspond e.g. to the squared absolute value of the audio signal in the corresponding limited period of time. This is however not limited.

In some embodiments, these features include the total silence length, which corresponds to the duration in which the participant is silent in the corresponding limited period of time.

The module 630 use the extracted features ($LTF_1$ or $LTF_{1/init}$ or $LTF_2$ or $LTF_{2/init}$) to generate a vector for each limited period of time. The vector can include e.g. an aggregation of the different extracted features. A vector is obtained for the limited period of time (see 610$_1$ to 610$_M$, also called long time vectors, as opposed to short time vectors, mentioned above). The different long time vectors can have a fixed predetermined size.

A module 635 (implemented e.g. by the PMC 110) aggregates (operation 656), for each limited period of time, the long-time vector (see 610$_1$ to 610$_M$), informative of a limited period of time, with the aggregated vector (see 611$_1$ to 611$_M$), informative of a plurality of short time fractions within this limited period of time, to obtain a dominance feature vector (see 620$_1$ to 620$_M$).

This aggregation can include a concatenation of the long-time vector (see 610$_1$ to 610$_M$) with the corresponding aggregated vector (see 611$_1$ to 611$_M$) (or other aggregation operations, such as averaging, etc.). The module 635 can store instructions executable by the PMC 110 to perform these operations.

In some embodiments, the module 635 can insert, in each dominance feature vector (see 620$_1$ to 620$_M$), a first derivative (delta) and/or a second derivative (delta-delta) of the aggregation of the long-time vector with the aggregated vector. The first derivative and/or the second derivative reflect the variations and the speed of variations of the features, which refine the baseline data.

As visible in FIG. 6A, operations 651 to 656 can be repeated over time, to generate a plurality of dominance feature vectors, which can be used to generate baseline data. When the duration of the plurality of limited periods of time (also called long time fractions) meets a threshold (note that this threshold is different from the threshold mentioned for the short time fractions), the plurality of dominance feature vectors can be aggregated (operation 658) to generate baseline data.

In particular, assume that it is intended to generate a first baseline data 310$_1$ (respectively 315$_1$, or 316$_1$). As mentioned above, the first baseline data 310$_1$ (respectively 315$_1$, or 316$_1$) is associated with a first initial period of time 310 (respectively 315, or 316). Each dominance feature vector generated by operations 651 to 657 is informative of a limited period of time (each dominance feature vector includes features $FT_{1/init/aggregated}$ which correspond to the aggregation of features $STF_{1/init}$ obtained for each of a plurality of short time fractions, and features $LTF_1$ informative of a limited period of time corresponding to the plurality of short time fractions). As a consequence, operations 651 to 656 are repeated to obtain e.g. M dominance feature vectors, associated with M limited periods of time 600$_1$ to 600$_M$. The M limited periods of time have a duration which meets the threshold. In this case, the threshold corresponds to the duration of the first initial period of time 310 (respectively 315, or 316). A non-limitative example of this duration is 30 sec. Note that, as mentioned above, the first initial period of time 310 (respectively 315, or 316) may be, in some embodiments, discontinuous, since the first initial period of time 310 (respectively 315, or 316) requires vocal communication from the participant. Therefore, for a given dominance feature vector informative of a given limited period of time, this given limited period of time (corresponding to a plurality of short time fractions) is not necessarily continuous. The plurality of dominance feature vectors 620$_1$ to 620$_M$ can be aggregated into a single vector 640 which corresponds to the first baseline data 310$_1$ (respectively 315$_1$, or 316$_1$). The aggregation can include e.g. concatenating the dominance feature vectors, or averaging the dominance feature vectors, etc.

Similarly, assume that it is intended to generate a first updated baseline data 420$_i$. As mentioned above, the first updated baseline data 420$_i$ is associated with a first period of time 400$_i$ (an example of a duration of the first period of time 400$_i$ is 10 sec—this value is not limitative). Each dominance feature vector generated by operations 651 to 656 is informative of a limited period of time (each dominance feature vector includes features $FT_{1/aggregated}$ which correspond to the aggregation of features $STF_1$ obtained for each of a plurality of short time fractions, and features $LTF_1$ informative of a limited period of time corresponding to the plurality of short time fractions). As a consequence, operations 651 to 656 are repeated to obtain e.g. M dominance feature vectors, associated with M limited periods of time 600$_1$ to 600$_M$. The M limited periods of time have a duration which meets the threshold. In this case, the threshold corresponds to the duration of the first period of time 400$_1$. The plurality of dominance feature vectors 620$_1$ to 620$_M$ can be aggregated into a single vector 640 which corresponds to the first updated baseline data 420$_1$.

Similarly, assume that it is intended to generate a second updated baseline data 520$_i$. As mentioned above, the second updated baseline data 520$_i$ is associated with a second period of time 500$_i$ (an example of a duration of the second period of time 500$_i$ is 10 sec—this value is not limitative). Each dominance feature vector generated by operations 651 to 656 is informative of a limited period of time (each dominance feature vector includes features $FT_{2/aggregated}$ which correspond to the aggregation of features $STF_2$ obtained for each of a plurality of short time fractions, and features $LTF_2$ informative of a limited period of time corresponding to the plurality of short time fractions). As a consequence, operations 651 to 656 are repeated to obtain e.g. M dominance feature vectors, associated with M limited periods of time 600$_1$ to 600$_M$. The M limited periods of time have a duration which meets the threshold. In this case, the threshold corresponds to the duration of the second period of time 500$_i$. The plurality of dominance feature vectors 620$_1$ to 620$_M$ can be aggregated into a single vector 640 which corresponds to the second updated baseline data 520$_i$.

In light of the foregoing, the baseline data includes a combination of audio features computed on short time fractions of the audio content and audio features computed on long time fractions of the audio content (also called limited periods of time). This helps to refine understanding of the behavior of each participant.

It has been mentioned above with reference to FIG. 5C that vectors (410$_{11}$ to 410$_{iM}$, or 510$_{11}$ to 510$_{iM}$) can be computed for limited periods of time (400$_{11}$ to 400$_{iM}$, or 500$_{11}$ to 500$_{iM}$) of each the first/second periods of time (400$_1$ to 400$_i$, or 510$_1$ to 510$_i$). Each vector (410$_{11}$ to 410$_{1M}$, or 510$_{11}$ to 510$_{iM}$—also called $VF_1$ or $VF_2$ above) can be computed using part of the method described with reference to FIGS. 6A to 6C. In particular, each vector can correspond to one of the dominance feature vectors (620$_1$ to 620$_M$). As mentioned above, each vector includes features (see e.g. 610$_1$ to 610$_M$) computed over a majority or all of the corresponding limited period of time (also called long time fractions—see e.g. 600$_1$ to 600$_M$), and features (see e.g. 609$_{11}$ to 609$_{ML}$) computed over each of a plurality of time fractions (short time fractions) of the corresponding limited period of time (see e.g. $\mathbf{609}_{11}$ to $\mathbf{609}_{ML}$). In other words, operations 651 to 656 can be used to generate each vector ($\mathbf{410}_{11}$ to $\mathbf{410}_{iM}$, or $\mathbf{510}_{11}$ to $\mathbf{510}_{iM}$—also called $VF_1$ or $VF_2$ above).

Figure 6D:
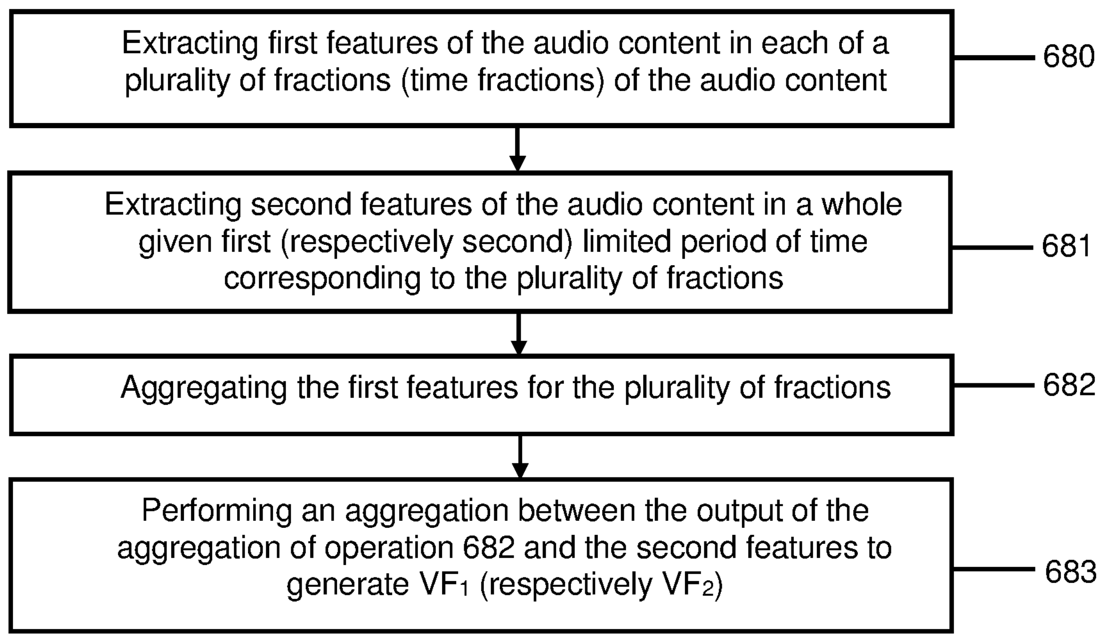
FIG. 6D illustrates a generalized flow-chart of a method of determining dominance feature vectors.

As visible in FIG. 6D, computation of $VF_1$ can include determining (operation 680, similar to operation 652) first features (e.g. pitch, intensity, etc.) of the audio content associated with the first (respectively second) participant in each of a plurality of short time fractions (operation 680, similar to operation 652), second features (for example, total speaking length, total speaking energy, etc.) of the audio content associated with the first participant, in a whole given first (respectively second) limited period of time corresponding to the plurality of short time fractions (operation 681, similar to 655), and using the first and second features to generate $VF_1$ (respectively $VF_2$). As visible in FIG. 6D, an aggregation of the first features over the plurality of fractions of the given first (respectively second) limited period of time can be performed (operation 682, similar to operation 653), and the output of this aggregation can be aggregated with the first features (operation 683, similar to operation 656), to generate $VF_1$ (respectively $VF_2$).

Note that at the beginning of the audio content of the first (respectively second) participant which is received at operation 650, the short time fractions of the audio content are used to determine dominance feature vectors which are used to build the first (respectively second) baseline data, as explained with reference to FIG. 6A. Once the first (respectively second) baseline data has been generated, the short time fractions are used to determine dominance feature vectors which are used to build the first (respectively second) baseline data, as explained with reference to FIG. 6A.

Figure 7A:
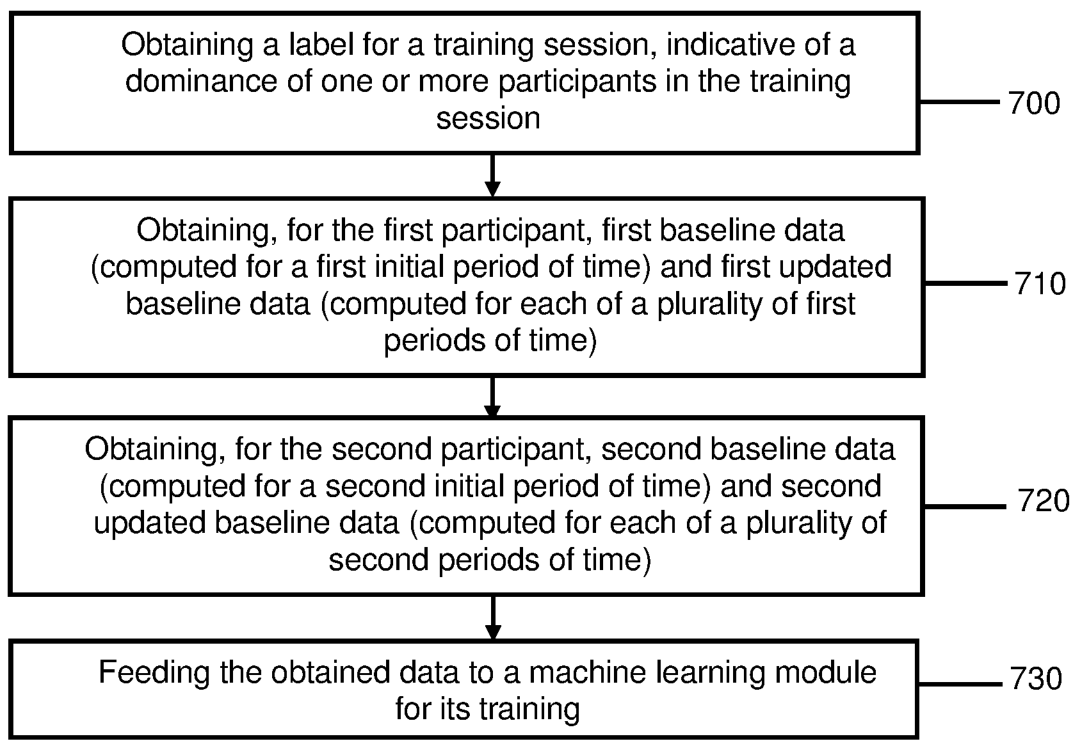
FIG. 7A illustrates a generalized flow-chart of a method of training a machine learning module to determine data informative of the dominance (relative dominance) of one or more participants of a session, based on the audio content of the session.

Attention is now drawn to FIG. 7A.

In order to train the machine learning module 140, a training method can include obtaining (operation 700), for at least one training session comprising at least an audio content, the training session involving a plurality of participants, a label informative of the dominance of at least one participant of the session. For example, the session may involve two participants, and an operator provides a score indicative of the dominance of each participant. In some embodiments, for each fraction of time of the session, the operator provides a label indicative of the dominance of each participant (and/or a label indicative of the most dominant participant with respect to the other participants).

The method further includes (operation 710), for a first participant of the session, obtaining first baseline data (computed for a first initial period of time) and first updated baseline data (computed for each of a plurality of first periods of time starting after an end of the first initial period of time). The first baseline data can be computed as explained with reference to FIGS. 3A to 3E, FIG. 5A, FIG. 5C and FIGS. 6A to 6C. Each first updated baseline data can be computed as explained with reference to FIGS. 3A to 3E, FIGS. 4A to 4C, FIG. 5A, FIG. 5C and FIGS. 6A to 6C.

The method further includes (operation 720), for a second participant of the session, obtaining second baseline data (computed for a second initial period of time) and second updated baseline data (computed for each of a plurality of second periods of time starting after an end of the second initial period of time). The second baseline data can be computed as explained with reference to FIGS. 3A to 3E, FIG. 5A, FIG. 5C and FIGS. 6A to 6C. Each second updated baseline data can be computed as explained with reference to FIGS. 3A to 3E, FIGS. 4A to 4C, FIG. 5A, FIG. 5C and FIGS. 6A to 6C.

The method further includes feeding (operation 730) the label, the first baseline data, the second baseline data, the first updated baseline data (computed over a plurality of first periods of time) and the second given updated baseline data (computed over a plurality of second periods of time) to the machine learning module 140, to train the machine learning module 140. The machine learning module 140 is trained to determine, using audio content of a given session including a plurality of participants, data $D_{dominance}$ informative of the dominance of one or more participants in the given session.

Figure 7B:
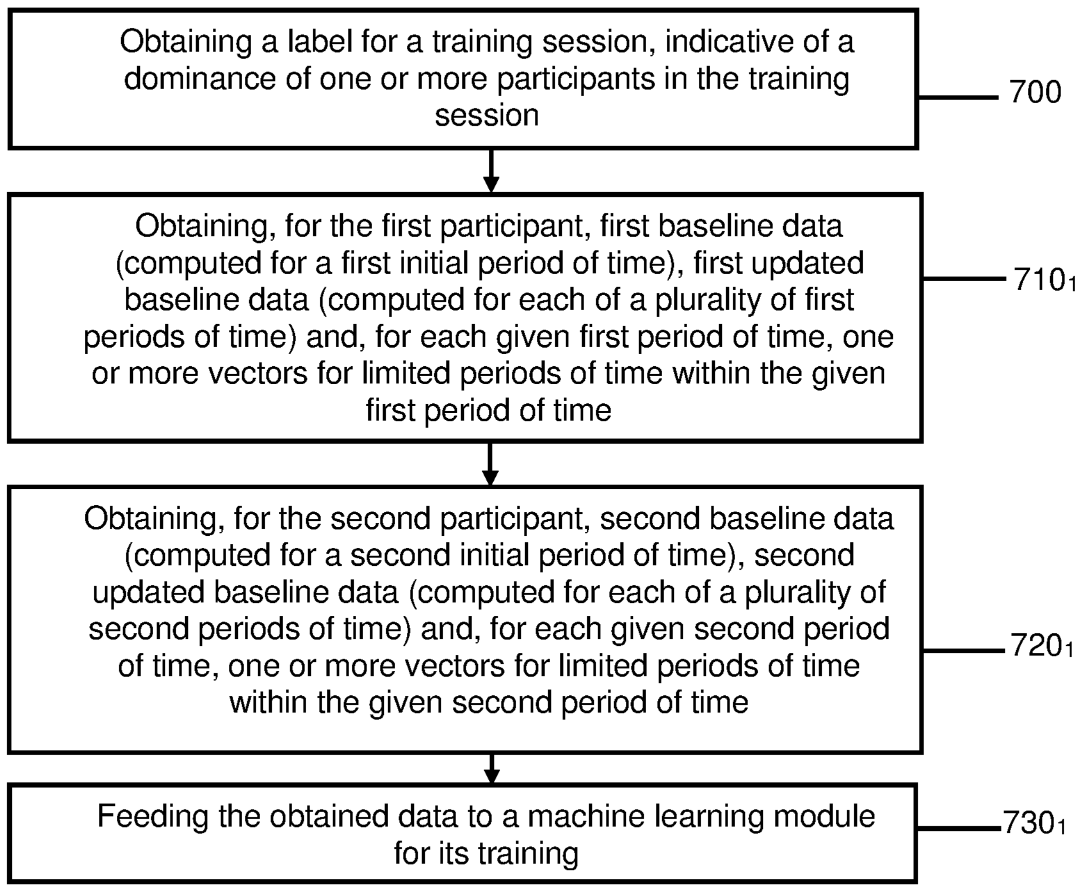
FIG. 7B illustrates a variant of the method of FIG. 7A.

FIG. 7B describes a training method, which is a variant of the training method of FIG. 7A. In the method of FIG. 7B, more data is fed to the machine learning module 140 for its training.

As mentioned above, in some embodiments, it is possible to compute, vectors ($\mathbf{410}_{11}$ to $\mathbf{410}_{iM}$—also called $VF_1$) for limited periods of time ($\mathbf{400}_{11}$ to $\mathbf{400}_{iM}$) of each the first periods of time ($\mathbf{400}_1$ to $\mathbf{400}_i$). Computation of these vectors can be performed as explained above (using at least part of the method described with reference to FIGS. 6A to 6C—see FIG. 6D).

For the first participant, for each first period of time, a vector ($\mathbf{410}_{11}$ to $\mathbf{410}_{iM}$—also called $VF_1$) can be fed to the machine learning module 140 for its training. The vector includes features informative of an audio content associated with the first participant in a first limited period of time being at least partially within the first period of time, wherein a duration of the first limited period of time is smaller than a duration of the first period of time.

In some embodiments, for each given first period of time, the vector is associated with the last limited period of time within this given first period of time (e.g. the first limited period of time ends when the first period of time ends).

The same process can be performed for the second participant.

As mentioned above, in some embodiments, it is possible to compute, vectors ($\mathbf{510}_{11}$ to $\mathbf{510}_{iM}$—also called $VF_2$) for limited periods of time ($\mathbf{500}_{11}$ to $\mathbf{500}_{1M}$) of each the second periods of time ($\mathbf{500}_1$ to $\mathbf{500}_i$). Computation of these vectors can be performed as explained above (using at least part of the method described with reference to FIGS. 6A to 6C—see FIG. 6D).

For the second participant, for each second period of time, a vector ($\mathbf{510}_{11}$ to $\mathbf{510}_{iM}$—also called $VF_2$) can be fed to the machine learning module 140 for its training. The vector includes features informative of an audio content associated with the second participant in a second limited period of time being at least partially within the second period of time, wherein a duration of the second limited period of time is smaller than a duration of the second period of time.

In some embodiments, for each given second period of time, the vector is associated with the last limited period of time within this given second period of time (e.g. the first limited period of time ends when the first period of time ends).

The machine learning module 140 is also fed (as in the method of FIG. 7A) with (see operations $\mathbf{710}_1$, $\mathbf{720}_1$ and $\mathbf{730}_1$) the label, the first baseline data, the second baseline data, the first updated baseline data (computed over a plurality of first periods of time) and the second given updated baseline data (computed over a plurality of second periods of time), to train the machine learning module 140. The machine learning module 140 is trained to determine, using audio content of a given session including a plurality of participants, data $D_{dominance}$ informative of the dominance of one or more participants in the given session.

In some embodiments, the machine learning module 140 can be trained using at least partially a supervised learning (e.g. semi-supervised learning).

Figure 8:
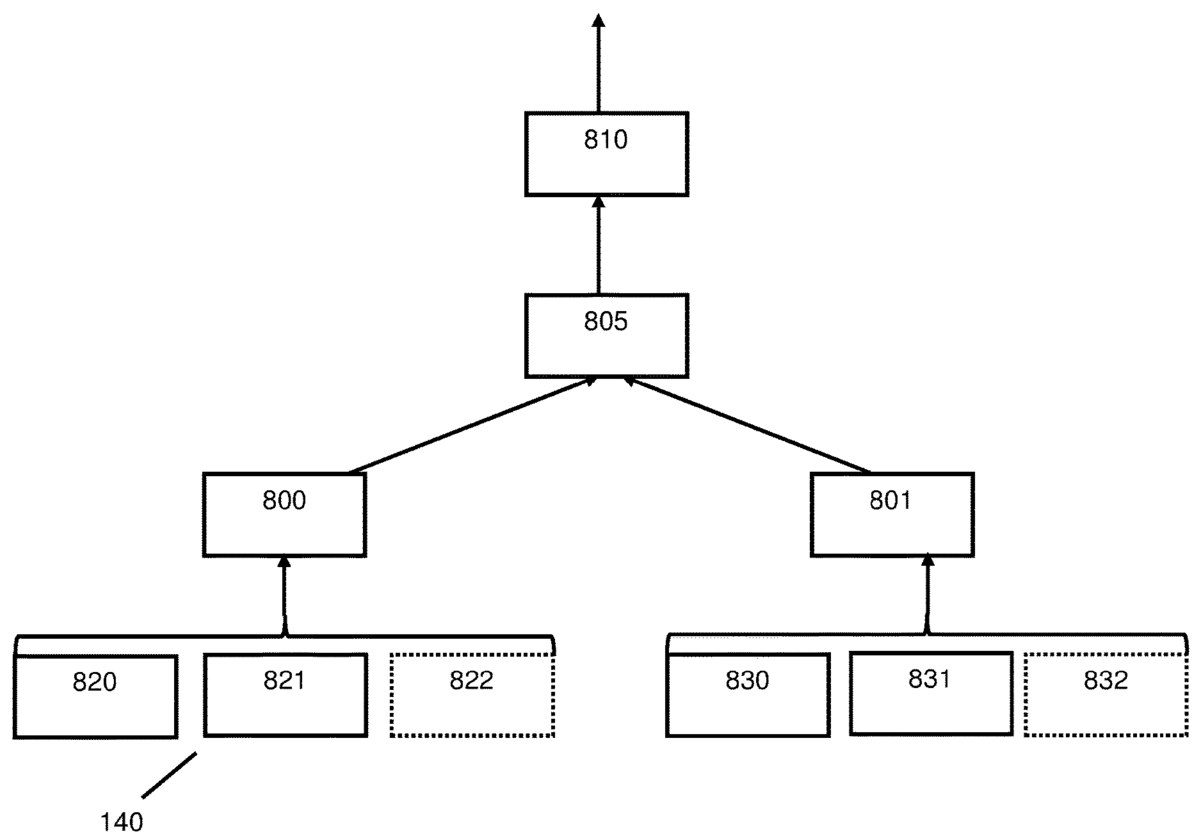
FIG. 8 illustrates a non-limitative embodiment of an architecture of a machine learning module usable for determining the dominance of one or more participants of a session, based on the audio content of the session.

Attention is now drawn to FIG. 8, which depicts a non-limitative architecture of the machine learning module 140.

The machine learning module 140 includes a first deep neural network 800, such as a LSTM network. The first deep neural network 800 is fed with the data associated with the first participant: first baseline data 820, first updated baseline data 821 (computed over a plurality of first periods of time), and in some embodiments, for each first period of time, a vector 822 (see e.g. above $\mathbf{410}_{11}$ to $\mathbf{410}_{iM}$ and $VF_1$) comprising features informative of an audio content associated with the first participant in a first limited period of time being at least partially within the first period of time.

The machine learning module 140 includes a second deep neural network 801, such as an LSTM network. The second deep neural network 801 is fed with the data associated with the second participant.

The second deep neural network 801 is fed with the data associated with the second participant: second baseline data 830, second updated baseline data 831 (computed over a plurality of second periods of time), and, in some embodiments, for each second period of time, a vector 832 (see e.g. above $\mathbf{510}_{11}$ to $\mathbf{510}_{1M}$ and $VF_2$) comprising features informative of an audio content associated with the second participant in a first limited period of time being at least partially within the second period of time.

The output of the first deep neural network 800 and the output of the second deep neural network 801 are fed to a fully connected FC layer 805.

In some embodiments, the FC layer 805 can be connected to a softmax function, which outputs data $D_{dominance}$.

Note that the training of the machine learning module 140 as depicted in FIG. 8 can include training the whole machine learning module 140, or training separately parts of the machine learning module 140 (e.g. training the first deep neural network 800 and the second deep neural network 801 separately).

The data $D_{dominance}$ can be used in various technical fields.

According to some embodiments, data $D_{dominance}$ can help a given participant to improve his social skills and/or a third party to better assess social skills of this given participant.

According to some embodiments, data $D_{dominance}$ can be used to generate feedback for a person in contact with the public, such as a sales person or a negotiator.

These examples are not limitative and various other applications can use the system as described above.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising a processor and memory circuitry (PMC) configured to, for at least one session comprising at least an audio content, the session involving at least a first participant and a second participant:

use one or more speech processing algorithms, from digitized audio content informative of the audio content of the session:

for the first participant:

extract features informative of an audio content associated with the first participant in a first initial period of time to generate first baseline data, for at least one first period of time starting after an end of the first initial period of time, extract features informative of an audio content associated with the first participant in the first period of time to generate first updated baseline data, for the second participant:

extract features informative of an audio content associated with the second participant in a second initial period of time to generate second baseline data, for at least one second period of time starting after an end of the second initial period of time, extract features informative of an audio content associated with the second participant in the second period of time to generate second updated baseline data, use one or more speech processing algorithms to determine, based on the digitized audio content, a vector $VF_1$ comprising features informative of an audio content associated with the first participant in a first limited period of time being at least partially within the first period of time, wherein a duration of the first limited period of time is shorter than a duration of the first period of time, use one or more speech processing algorithms to determine, based on the digitized audio content, a vector $VF_2$ comprising features informative of an audio content associated with the second participant in a second limited period of time being at least partially within the second period of time, wherein a duration of the second limited period of time is shorter than a duration of the second period of time, feed the first baseline data, the second baseline data, the first updated baseline data, the second updated baseline data, $VF_1$ and $VF_2$ to a machine learning deep neural network, and determine, using the machine learning deep neural network, data $D_{dominance}$ informative of a dominance of at least one of the first participant or the second participant in at least part of the session based on the first baseline data, the second baseline data, the first updated baseline data, the second updated baseline data, $VF_1$ and $VF_2$.

2. The system of claim 1, wherein the first period of time and the second period of time match a synchronization criterion, wherein the system is configured to determine data $D_{dominance}$ informative of the dominance of at least one of the first participant or the second participant in at least one of part of the first period of time or part of the second period of time.

3. The system of claim 1, wherein:

the first initial period of time has a duration which is longer than a duration of the at least one first period of time, and the second initial period of time has a duration which is longer than a duration of the at least one second period of time.

4. The system of claim 1, configured to:

repeatedly generate given first updated baseline data for each of plurality of given first periods of time starting after an end of the first initial period of time, thereby obtaining a plurality of first updated baseline data, repeatedly generate given second updated baseline data for each of plurality of given second periods of time starting after an end of the second initial period of time, thereby obtaining a plurality of second updated baseline data, feed the first baseline data, the second baseline data, the plurality of first updated baseline data and the plurality of second updated baseline data to the deep neural network, and determine, using the deep neural network, data $D_{dominance}$ informative of the dominance of at least one of the first participant or the second participant in at least part of the session.

5. The system of claim 1, configured to perform at least one of (i) or (ii):

(i) determining, within an assessment period starting at a time at which the first participant started to produce vocal communication in the session, a period of time for which an amount of vocal communication time of the first participant meets a required duration, and select this period of time as the first initial period of time;

(ii) determining, within an assessment period starting at a time at which the second participant started to produce vocal communication in the session, a period of time for which an amount of vocal communication of the second participant meets a required duration, and select this period of time as the second initial period of time.

6. The system of claim 5, wherein at least one of the first initial period of time or the second initial period of time is discontinuous.

7. The system of claim 5, configured to perform at least one of (i) or (ii):

(i) upon determination that there is no period of time for which an amount of vocal communication of the first participant meets the required duration within the assessment period, selecting all of one or more fractions of the assessment period in which the first participant produced vocal communication as the first initial period of time;

(ii) upon determination that there is no period of time for which an amount of speech time of the second participant meets the required duration within the assessment period, selecting all of one or more fractions of the assessment period in which the second participant produced vocal communication as the second initial period of time.

8. The system of claim 1, wherein the deep neural network is at least partially trained to determine $D_{dominance}$ using supervised learning, the supervised learning using a training set comprising:

an audio content of a training session including a plurality of participants, one or more labels defining the dominance of one or more of the participants in the training session.

9. The system of claim 1, configured to perform at least one of (i) or (ii):

(i) determining first features of the audio content associated with the first participant in each of a plurality of fractions of the first limited period of time and second features of the audio content associated with the first participant, in the whole first limited period of time, and using the first and second features to generate $VF_1$, (ii) determining first features of the audio content associated with the second participant in each of a plurality of fractions of the second limited period of time and second features of the audio content associated with the second participant, in the whole second limited period of time, and using the first and second features to generate $VF_2$.

10. The system of claim 1, configured to perform at least one of (i) or (ii):

(i) determining:

features $STF_{1/init}$ of the audio content associated with the first participant in each of a plurality of first time fractions of the audio content, features $LTF_{1/init}$ of the audio content associated with the first participant in a first limited period of time corresponding to the plurality of first time fractions, wherein the first limited period of time is within the first initial period of time and has a duration shorter than the first initial period of time, and using $STF_{1/init}$ and $LTF_{1/init}$ to generate the first baseline data;

(ii) determining:

features $STF_{2/init}$ of the audio content associated with the second participant in each of a plurality of second time fractions of the audio content, features $LTF_{2/init}$ of the audio content associated with the second participant in a second limited period of time corresponding to the plurality of second time fractions, wherein the second limited period of time is within the second initial period of time and has a duration shorter than the first initial period of time, and using $STF_{2/init}$ and $LTF_{2/init}$ to generate the second baseline data.

11. The system of claim 10, configured to perform at least one of (i) or (ii):

(i) for a given first limited period of time, performing an aggregation operation of features $LTF_{1/init}$ obtained for this given first limited period of time with features $STF_{1/init}$ obtained for a plurality of given first time fractions of this given first limited period of time, to obtain $FT_{1/init/aggregated}$, and using $FT_{1/init/aggregated}$ to generate the first baseline data, (ii) for a given second limited period of time, performing an aggregation operation of features $LTF_{2/init}$ obtained for this given second limited period of time with features $STF_{2/init}$ obtained for a plurality of given second time fractions of this given second limited period of time, to obtain $FT_{2/init/aggregated}$, and using $FT_{2/init/aggregated}$ to generate the second baseline data.

12. The system of claim 11, configured to perform at least one of (i) or (ii):

(i) determining $FT_{1/init/aggregated}$ over a plurality of first limited periods of time within the first initial period of time to generate the first baseline data;

(ii) determining $FT_{2/init/aggregated}$ over a plurality of second limited periods of time within the second initial period of time to generate the second baseline data.

13. The system of claim 1, configured to perform at least one of (i) or (ii):

(i) determining:

features $STF_1$ of the audio content associated with the first participant in each of a plurality of first time fractions of the audio content, features $LTF_1$ of the audio content associated with the first participant in a first limited period of time corresponding to the plurality of first time fractions, wherein the first limited period of time is within the first period of time and has a duration shorter than the first period of time, and using $STF_1$ and $LTF_1$ to generate the first updated baseline data;

(ii) determining:

features $STF_1$ of the audio content associated with the second participant in each of a plurality of second time fractions of the audio content, features $LTF_1$ of the audio content associated with the second participant in a second limited period of time corresponding to the plurality of second time fractions, wherein the second limited period of time is within the second period of time and has a duration shorter than the second period of time, and using $STF_2$ and $LTF_2$ to generate the second updated baseline data.

14. The system of claim 13, configured to perform at least one of (i) or (ii):

(i) for a given first limited period of time, performing an aggregation operation of features $LTF_1$ obtained for this given first limited period of time with features $STF_1$ obtained for a plurality of given first time fractions of this given first limited period of time, to obtain $FT_{1/aggregated}$, and using $FT_{1/aggregated}$ to generate the first updated baseline data, (ii) for a given second limited period of time, performing an aggregation operation of features $LTF_2$ obtained for this given second limited period of time with features $STF_2$ obtained for a plurality of given second time fractions of this given second limited period of time, to obtain $FT_{2/aggregated}$, and using $FT_{2/aggregated}$ to generate the second updated baseline data.

15. The system of claim 14, configured to perform at least one of (i) or (ii):

(i) determining $FT_{1/aggregated}$ over a plurality of first limited periods of time within the first period of time to generate the first updated baseline data;

(ii) determining $FT_{2/aggregated}$ over a plurality of second limited periods of time within the second period of time to generate the second updated baseline data.

16. The system of claim 1, wherein the features comprise at least one of pitch, intensity of speech, speech rate, total speaking energy, total speaking length, total silence length.

17. A system comprising a processor and memory circuitry (PMC) configured to:

obtain, for at least one session comprising at least an audio content, the session involving a first participant and a second participant, a label informative of a dominance of at least of the first participant or the second participant of the session, using one or more speech processing algorithms, from digitized audio content informative of the audio content of the session:

for the first participant:

extracting features informative of an audio content associated with the first participant in a first initial period of time to generate first baseline data, for at least one first period of time starting after an end of the first initial period of time, extracting features informative of an audio content associated with the first participant in the first period of time to generate first updated baseline data, for the second participant:

extracting features informative of an audio content associated with the second participant in a second initial period of time to generate second baseline data, for at least one second period of time starting after an end of the second initial period of time, extracting features informative of an audio content associated with the second participant in the second period of time to generate second updated baseline data, using one or more speech processing algorithms to determine, based on the digitized audio content, a vector $VF_1$ comprising features informative of an audio content associated with the first participant in a first limited period of time being at least partially within the first period of time, wherein a duration of the first limited period of time is shorter than a duration of the first period of time, using one or more speech processing algorithms to determine, based on the digitized audio content, a vector $VF_2$ comprising features informative of an audio content associated with the second participant in a second limited period of time being at least partially within the second period of time, wherein a duration of the second limited period of time is shorter than a duration of the second period of time, using the label, the first baseline data, the second baseline data, the first updated baseline data, the second updated baseline data, $VF_1$ and $VF_2$ to train a deep neural network, using the trained deep neural network to determine data $D_{dominance}$ informative of the dominance of one or more participants of a plurality of participants in a given session, based on an audio content of the given session.

18. The system of claim 17, configured to perform at least one of (i), or (ii), or (iii) or (iv):

(i) determining:

features $STF_{1/init}$ of the audio content associated with the first participant in each of a plurality of first time fractions of the audio content, features $LTF_{1/init}$ of the audio content associated with the first participant in a first limited period of time corresponding to the plurality of first time fractions, wherein the first limited period of time is within the first initial period of time and has a duration shorter than the first initial period of time, and using $STF_{1/init}$ and $LTF_{1/init}$ to generate the first baseline data;

(ii) determining:

features $STF_{2/init}$ of the audio content associated with the second participant in each of a plurality of second time fractions of the audio content, features $LTF_{2/init}$ of the audio content associated with the second participant in a second limited period of time corresponding to the plurality of second time fractions, wherein the second limited period of time is within the second initial period of time and has a duration shorter than the first initial period of time, and using $STF_{2/init}$ and $LTF_{2/init}$ to generate the second baseline data;

(iii) determining:

features $STF_1$ of the audio content associated with the first participant in each of a plurality of first time fractions of the audio content, features $LTF_1$ of the audio content associated with the first participant in a first limited period of time corresponding to the plurality of first time fractions, wherein the first limited period of time is within the first period of time and has a duration shorter than the first period of time, and using $STF_1$ and $LTF_1$ to generate the first updated baseline data;

(iv) determining:

features $STF_1$ of the audio content associated with the second participant in each of a plurality of second time fractions of the audio content, features $LTF_1$ of the audio content associated with the second participant in a second limited period of time corresponding to the plurality of second time fractions, wherein the second limited period of time is within the second period of time and has a duration shorter than the second period of time, and using $STF_2$ and $LTF_2$ to generate the second updated baseline data.

19. A non-transitory computer readable medium comprising instructions that, when executed by a processor and memory circuitry (PMC), cause the PMC to perform operations comprising, for at least one session comprising at least an audio content, the session involving at least a first participant and a second participant:

using one or more speech processing algorithms, from digitized audio content informative of the audio content of the session:

for the first participant:

extracting features informative of an audio content associated with the first participant in a first initial period of time to generate first baseline data, for at least one first period of time starting after an end of the first initial period of time, extracting features informative of an audio content associated with the first participant in the first period of time to generate first updated baseline data, for the second participant:

extracting features informative of an audio content associated with the second participant in a second initial period of time to generate second baseline data, for at least one second period of time starting after an end of the second initial period of time, extracting features informative of an audio content associated with the second participant in the second period of time to generate second updated baseline data, using one or more speech processing algorithms to determine, based on the digitized audio content, a vector $VF_1$ comprising features informative of an audio content associated with the first participant in a first limited period of time being at least partially within the first period of time, wherein a duration of the first limited period of time is shorter than a duration of the first period of time, using one or more speech processing algorithms to determine, based on the digitized audio content, a vector $VF_2$ comprising features informative of an audio content associated with the second participant in a second limited period of time being at least partially within the second period of time, wherein a duration of the second limited period of time is shorter than a duration of the second period of time, feeding the first baseline data, the second baseline data, the first updated baseline data and the second updated baseline data, $VF_1$ and $VF_2$ to a deep neural network, and determining, using the deep neural network, data $D_{dominance}$ informative of a dominance of at least one of the first participant or the second participant in at least part of the session based on the first baseline data, the second baseline data, the first updated baseline data, the second updated baseline data, $VF_1$ and $VF_2$.

* * * * *